United States Patent
Eguchi et al.

(10) Patent No.: US 9,903,604 B2
(45) Date of Patent: Feb. 27, 2018

(54) HUMIDITY CONTROL AND VENTILATION DEVICE

(71) Applicant: DAIKIN INDUSTRIES, LTD., Osaka-shi, Osaka (JP)

(72) Inventors: Akihiro Eguchi, Osaka (JP); Gakuto Sakai, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 266 days.

(21) Appl. No.: 14/431,169

(22) PCT Filed: Sep. 24, 2013

(86) PCT No.: PCT/JP2013/005624
§ 371 (c)(1),
(2) Date: Mar. 25, 2015

(87) PCT Pub. No.: WO2014/057617
PCT Pub. Date: Apr. 17, 2014

(65) Prior Publication Data
US 2015/0241076 A1 Aug. 27, 2015

(30) Foreign Application Priority Data
Oct. 10, 2012 (JP) ................................. 2012-225317

(51) Int. Cl.
*F24F 11/00* (2006.01)
*F24F 11/047* (2006.01)
(Continued)

(52) U.S. Cl.
CPC .......... *F24F 11/0001* (2013.01); *F24F 3/147* (2013.01); *F24F 6/00* (2013.01);
(Continued)

(58) Field of Classification Search
CPC .......... F24F 11/0079; F24F 2011/0002; F24F 11/047; F24F 3/147; F24F 11/0001
See application file for complete search history.

(56) References Cited

U.S. PATENT DOCUMENTS 4,437,608 A 3/1984 Smith
4,497,242 A 2/1985 Moyer
(Continued)

FOREIGN PATENT DOCUMENTS

JP 2006-046731 A 2/2006
JP 2009-109134 A 5/2009
(Continued)

*Primary Examiner* — David Teitelbaum
*Assistant Examiner* — Schyler S Sanks
(74) *Attorney, Agent, or Firm* — Birch, Stewart, Kolasch & Birch, LLP

(57) ABSTRACT

A humidity control and ventilation device includes: a determiner determining that another ventilation device has turned on, if at least one of an increasing variation in the rotation speed of the air supply fan and an increasing variation in the rotation speed of the exhaust fan exceeds a corresponding one of predetermined values while the air supply fan and the exhaust fan are under the constant airflow rate control; and an air-flow-rate controller decreasing one of the rotation speed of the air supply fan or the rotation speed of the exhaust fan if the determiner determines that the ventilation device is on, such that a total air supply rate and a total air exhaust rate in the ventilation target space are balanced with each other.

3 Claims, 12 Drawing Sheets

(51) Int. Cl.
*F24F 6/00* (2006.01)
*F24F 7/06* (2006.01)
*F24F 3/147* (2006.01)

(52) U.S. Cl.
CPC ............ *F24F 7/06* (2013.01); *F24F 11/0008* (2013.01); *F24F 11/0012* (2013.01); *F24F 11/0015* (2013.01); *F24F 11/0079* (2013.01); *F24F 11/047* (2013.01); *F24F 2011/0013* (2013.01); *F24F 2011/0016* (2013.01); *Y02B 30/746* (2013.01)

(56) References Cited

U.S. PATENT DOCUMENTS

2006/0117769 A1* 6/2006 Helt .................... F24F 11/0001
62/161
2009/0061752 A1 3/2009 Burdett et al.
2012/0286715 A1* 11/2012 Nakajima ............. H02P 7/2913
318/450

FOREIGN PATENT DOCUMENTS

| | | | | |
|---|---|---|---|---|
| JP | 2009109134 A | * | 5/2009 | |
| JP | 4424113 B2 | * | 3/2010 | |
| JP | 2010-190524 A | | 9/2010 | |
| JP | 2010-255960 A | | 11/2010 | |
| WO | WO 2011092756 A1 | * | 8/2011 | .......... F24F 11/0079 |

* cited by examiner

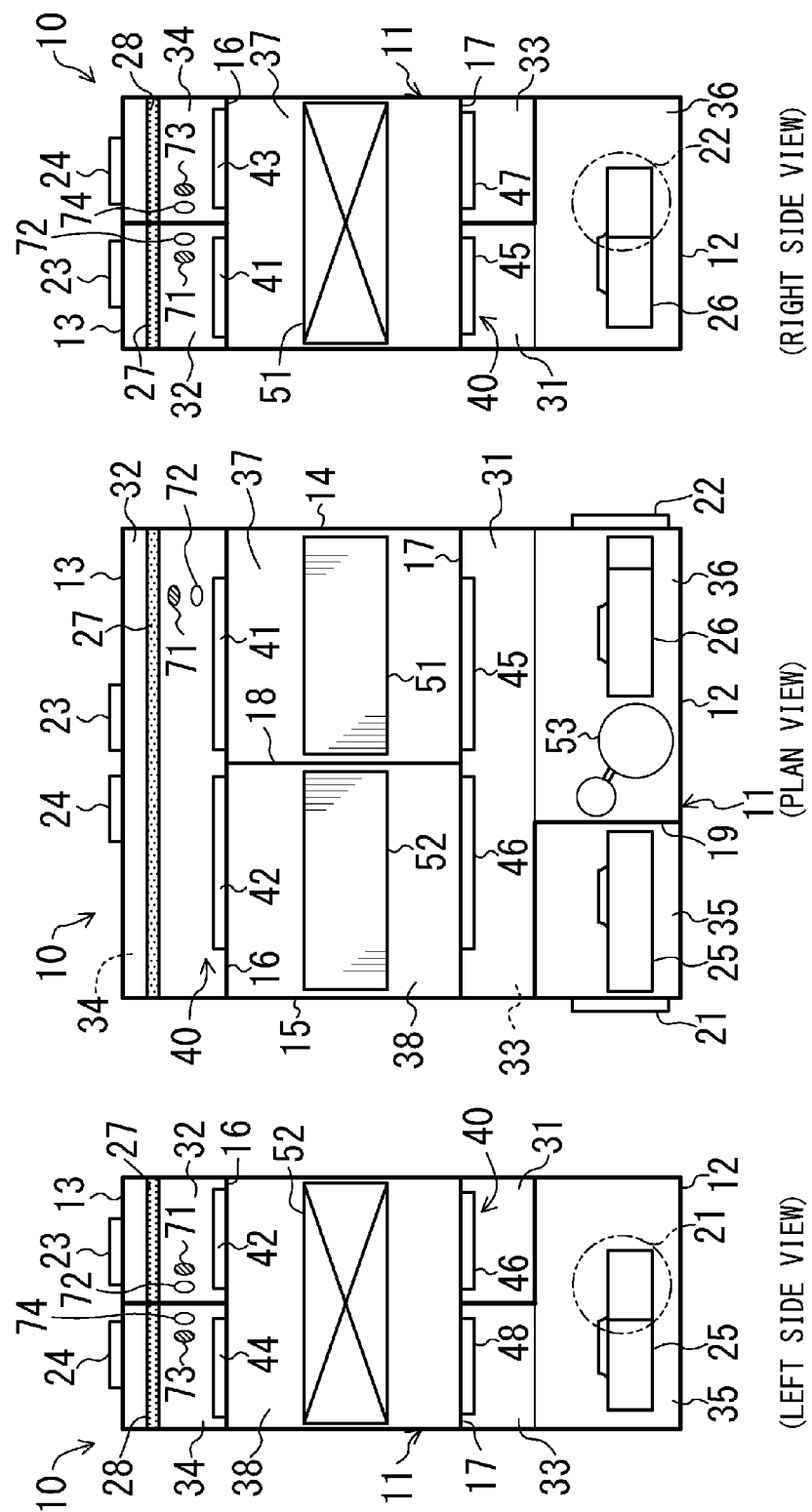

SECOND REFRIGERATION CYCLE OPERATION

FIRST REFRIGERATION CYCLE OPERATION

HUMIDITY CONTROL AND VENTILATION DEVICE

TECHNICAL FIELD

The present invention relates to a humidity control and ventilation device that ventilates a room and controls humidity of the room.

BACKGROUND ART

Humidity control and ventilation devices known in the art ventilate rooms and control humidity of the rooms. PATENT DOCUMENT 1 discloses one of such humidity control and ventilation devices. The humidity control and ventilation device includes an air supply fan and an exhaust fan, and ventilates a room. In other words, the humidity control and ventilation device causes the air supply fan to supply outdoor air into a room, and simultaneously causes the exhaust fan to exhaust room air from the room. Furthermore, this humidity control and ventilation device includes a refrigerant circuit (humidity controller) to which an adsorption heat exchanger is connected, and controls humidity of the room, i.e., dehumidifies or humidifies the room.

Specifically, when the humidity control and ventilation device operates in a dehumidification mode, moisture in the air is adsorbed onto an adsorbent of the adsorption heat exchanger acting as an evaporator. Thus, such dehumidified air is supplied into the room. In addition, when the humidity control and ventilation device operates in a humidification mode, the moisture desorbs from the adsorbent of the adsorption heat exchanger acting as a condenser. Then such desorbing moisture is released into the air. Thus, the humidified air is supplied into the room.

Moreover, the humidity control and ventilation device disclosed in PATENT DOCUMENT 1 controls an airflow rate to be constant to keep a ventilation air volume (supply airflow rate and exhaust airflow rate) of the room optimized. This constant airflow rate control involves adjusting rotation speeds of the air supply fan and the exhaust fan such that the airflow rates of the air supply fan and the exhaust fan are brought close to predetermined target airflow rates of the fans.

CITATION LIST

Patent Document

PATENT DOCUMENT 1: Japanese Unexamined Patent Publication No. 2009-109134

SUMMARY OF THE INVENTION

Technical Problem

A target space that a humidity control and ventilation device is to ventilate can be provided with another ventilation device such as an air supplying device and an air exhausting device. Operation of such another ventilation device during the constant airflow rate control of the humidity control and ventilation device would lead to excessive supply and exhaust rates of airflow, and could cause an excessive use of power of an exhaust fan and an air supply fan. This problem will be specifically described below.

For example, in a ventilation target space provided with an air exhausting device, suppose the air exhausting device has turned on while a humidity control and ventilation device is operating. Here the ventilation target space is under negative pressure as the air exhausting device is operating. This decreases the resistance of the air supply fan to airflow, and, in contrast, increases the airflow resistance of the exhaust fan to airflow. Hence, under the constant airflow rate control, the rotation speed of the air supply fan is adjusted to be lower such that the airflow rate of the air supply fan does not exceed its target airflow rate. In contrast, the rotation speed of the exhaust fan is adjusted to be higher such that the airflow rate of the exhaust fan does not fall below its target airflow rate. In such operation, the entire exhaust airflow rate exceeds the entire supply airflow rate in the ventilation target space. As a result, this causes an excessive use of the power for the exhaust fan.

Furthermore, in, for example, a ventilation target space provided with an air supplying device, suppose the air supply fan has turned on while a humidity control and ventilation device is operating. Here the ventilation target space is under positive pressure as the air supply unit is operating. This increases the resistance of the air supply fan to airflow, and, in contrast, decreases the resistance of the exhaust fan to airflow. Hence, under the constant airflow rate control, the rotation speed of the air supply fan is adjusted to be higher such that the airflow rate of the air supply fan does not fall below its target airflow rate. In contrast, the rotation speed of the exhaust fan is adjusted to be lower such that the airflow rate of the exhaust fan does not exceed its target airflow rate. Under such operation, the entire supply airflow rate exceeds the entire exhaust airflow rate in the ventilation target space. As a result, this causes an excessive use of the power of the air supply fan.

Hence the operation of another ventilation device while the humidity control and ventilation device is executing the constant airflow rate control causes an excessive use of the power of the air supply fan and the exhaust fan, failing to achieve energy conservation. In contrast, one of the solutions to this problem would be to send a signal, indicating that another ventilation device is on, to a humidity control and ventilation device, and to control the rotation speeds of an air supply fan and an exhaust fan in conjunction with the operation of the other ventilation device. However, such a solution requires connection between the humidity control and ventilation device and the other ventilation device with, for example, a communications cable every time the humidity control and ventilation device is installed. This makes the installation complex, and increases the number of components for the installation.

It is therefore an object of the present invention to propose a humidity control and ventilation device that prevents an increase in power of a fan, caused by operation of another ventilation device, without communications between the humidity control and ventilation device and another ventilation device.

Solution to the Problem

A humidity control and ventilation device according to a first aspect of the present invention includes: an air supply fan (26) which supplies outdoor air into a ventilation target space (S); an exhaust fan (25) which exhausts air in the ventilation target space (S) out of the room; a humidity controller (50) which controls humidity of the air in the ventilation target space (S); an air-flow-rate controller (101) which executes constant airflow rate control to bring airflow rates of the air supply fan (26) and the exhaust fan (25) close to respective target airflow rates, the constant airflow rate control including adjusting a rotation speed of the air supply fan (26) and a rotation speed of the exhaust fan (25); and a determiner (103) which determines that another ventilation device (80, 90) has turned on, if at least one of an increasing variation in the rotation speed of the air supply fan (26) or an increasing variation in the rotation speed of the exhaust fan (25) exceeds a corresponding one of predetermined values while the air supply fan (26) and the exhaust fan (25) are under the constant airflow rate control, wherein if the determiner (103) determines that the ventilation device (80, 90) is on, the air-flow-rate controller (101) decreases one of the rotation speed of the air supply fan (26) or the rotation speed of the exhaust fan (25) such that a total air supply rate and a total air exhaust rate in the ventilation target space (S) are balanced with each other.

In the first aspect, the determiner (103) determines that the other ventilation device (80, 90) has turned on while the air supply fan (26) and the exhaust fan (25) are under the constant airflow rate control. Specifically, when the other ventilation device (such as an air supplying device and an air exhausting device) turns on, the pressure in the ventilation target space (S) varies, leading to an increase in airflow resistance of the air supply fan (26) and the exhaust fan (25). As a result, the air-flow-rate controller (101) increases the rotation speeds of the air supply fan (26) and the exhaust fan (25) to control their airflow rates to be constant. Thus, if the increasing variations in the rotation speeds of the air supply fan (26) and the exhaust fan (25) exceed respective predetermined values, the determiner (103) determines that the other ventilation device (80, 90) has turned on. Thus, if the determiner (103) determines that the other ventilation device (80, 90) has turned on, the air-flow-rate controller (101) decreases the rotation speed of one of the air supply fan (26) or the exhaust fan (25) such that the total air supply rate and the total air exhaust rate in the ventilation target space (S) are balanced with each other. As a result, this makes it possible to immediately prevent a problem of excessive airflow rates of the air supply fan (26) or the exhaust fan (25) by the turn-on of the other ventilation device (80, 90).

According to a second aspect of the present invention, if the determiner (103) determines that an air exhausting device (80) as the other ventilation device (80, 90) is on, the air-flow-rate controller (101) in the first aspect can decrease the rotation speed of the exhaust fan (25).

In the second aspect, the determiner (103) determines that the air exhausting device (80) as the other ventilation device is on. According to the determination, the air-flow-rate controller (101) reduces the rotation speed of the exhaust fan (25). Specifically, when the air exhausting device (80) as the ventilation device operates while the air supply fan (26) and the exhaust fan (25) are executing the constant airflow rate control, pressure in the ventilation target space (S) decreases to be negative pressure. The resulting negative pressure increases the airflow resistance of the exhaust fan (25) to vary and increase the rotation speed of the exhaust fan (25). Thus, when the increasing variation in the rotation speed of the exhaust fan (25) exceeds the predetermined value, the determiner (103) determines that the air exhausting device (80) has turned on. Then, if the air exhausting device (80) is determined to be on, the air-flow-rate controller (101) decreases the rotation speed of the exhaust fan (25). As a result, this makes it possible to immediately prevent the problem of an excessive airflow rate of the exhaust fan (25) after the air exhausting device (80) turns on.

According to a third aspect of the present invention, while the air supply fan (26) and the exhaust fan (25) are under the constant airflow rate control, the determiner (103) in the second aspect can determine that the air exhausting device (80) has turned on if a decreasing variation in the rotation speed of the air supply fan (26) exceeds a predetermined value simultaneously when the increasing variation in the rotation speed of the exhaust fan (25) exceeds the corresponding one of the predetermined values.

The determiner (103) in the third aspect determines that the air exhausting device (80) has turned on based on both the increasing variation in the rotation speed of the exhaust fan (25) and the decreasing variation in the rotation speed of the air supply fan (26). In other words, when the air exhausting device (80) is on while the air supply fan (26) and the exhaust fan (25) are under the constant airflow rate control, and the ventilation target space (S) is of negative pressure, the airflow resistance of the exhaust fan (25) increases as the airflow resistance of the air supply fan (26) decreases. Then the constant airflow rate control causes the rotation speed of the exhaust fan (25) to increase and simultaneously causes the rotation speed of the air supply fan (26) to decrease. Thus, when the decreasing variation in the rotation speed of the air supply fan (26) exceeds a predetermined value simultaneously when the increasing variation in the rotation speed of the exhaust fan (25) exceeds a predetermined value, the determiner (103) determines that the air exhausting device (80) has turned on.

According to a fourth aspect of the present invention, if the determiner (103) determines that the air supplying device (90) as the other ventilation device (80, 90) is on, the air-flow-rate controller (101) in the first aspect can decrease the rotation speed of the air supply fan (26).

In the fourth aspect, the determiner (103) determines that the air supplying device (90) as the other ventilation device is on. According to the determination, the air-flow-rate controller (101) reduces the rotation speed of the exhaust fan (25). Specifically, when the air supplying device (90) operates while the air supply fan (26) and the exhaust fan (25) are under the constant airflow rate control, pressure in the ventilation target space (S) increases to be positive pressure. The resulting positive pressure increases the airflow resistance of the air supply fan (26) to vary and increase the rotation speed of the air supply fan (26). Thus, when the increasing variation in the rotation speed of the air supply fan (26) exceeds a predetermined value, the determiner (103) determines that the air exhausting device (80) has turned on. Then, if the air supplying device (90) is determined to be on, the air-flow-rate controller (101) decreases the rotation speed of the air supply fan (26). This makes it possible to immediately prevent the problem of an excessive airflow rate of the air supply fan (26) after the air supplying device (90) turns on.

According to a fifth aspect of the present invention, while the air supply fan (26) and the exhaust fan (25) are under the constant airflow rate control, the determiner (103) in the fourth aspect can determine that the air supplying device (90) has turned on if a decreasing variation in the rotation speed of the exhaust fan (25) exceeds a predetermined value simultaneously when the increasing variation in the rotation speed of the air supply fan (26) exceeds the corresponding one of the predetermined values.

The determiner (103) in the fifth aspect determines that the air exhausting device (90) has turned on based on both the increasing variation in the rotation speed of the exhaust fan (26) and the decreasing variation in the rotation speed of the air supply fan (25). In other words, when the air supplying device (90) is on while the air supply fan (26) and the exhaust fan (25) are under the constant airflow rate control, and the ventilation target space (S) is of positive pressure, the airflow resistance of the air supply fan (26)

increases as the airflow resistance of the exhaust fan (25) decreases. Then the constant airflow rate control causes the rotation speed of the air supply fan (26) to increase and simultaneously causes the rotation speed of the exhaust fan (25) to decrease. Thus, when the increasing variation in the rotation speed of the air supply fan (26) exceeds a predetermined value as the decreasing variation in the rotation speed of the exhaust fan (25) exceeds a predetermined value, the determiner (103) determines that the air supplying device (90) has turned on.

Advantages of the Invention

The first aspect of the present invention makes it possible to immediately determine that the other ventilation device (80, 90) is on while the air supply fan (26) and the exhaust fan (25) are under the constant airflow rate control, based on an increasing variation in the rotation speed of one of the air supply fan (26) or the exhaust fan (25). Hence, the first aspect can prevent excessive airflow rates of the air supply fan (26) and the exhaust fan (25) by the turn-on of the other ventilation device (80, 90), without communications between the humidity control and ventilation device (10) and the other ventilation device (80, 90). Consequently, the first aspect achieves reduction in the power of the air supply fan (26) and the exhaust fan (25) and improvement in energy conservation, without complicating the structure of the humidity control and ventilation device (10).

The second aspect of the present invention makes it possible to prevent an excessive airflow rate of the exhaust fan (25) by the turn-on of the air exhausting device (80), without communications between the humidity control and ventilation device (10) and the air exhausting device (80). Consequently, the second aspect achieves reduction in the power of the exhaust fan (25).

The third aspect of the present invention makes it possible to determine that the air exhausting device (80) has turned on, if both the increasing variation in the rotation speed of the exhaust fan (25) and a decreasing variation in the rotation speed of the air supply fan (26) exceed respective predetermined values while the air supply fan (26) and the exhaust fan (25) are under the constant airflow rate control. This can prevent the determiner (103) from making an erroneous determination that the exhaust unit (80) has turned on, when the rotation speed of the exhaust fan (25) varies and increases because of, for example, clog-up of a filter for an exhaust passageway corresponding to the exhaust fan (25), or a malfunction of a damper.

The fourth aspect of the present invention makes it possible to prevent an excessive airflow rate of the air supply fan (26) by the turn-on of the air supplying device (90), without communications between the humidity control and ventilation device (10) and the air supplying device (90). Consequently, the fourth aspect achieves reduction in the power of the air supply fan (26).

The fifth aspect of the present invention makes it possible to determine that the air supplying device (90) has turned on, if both the increasing variation in the rotation speed of the air supply fan (26) and a decreasing variation in the rotation speed of the exhaust fan (25) exceed respective predetermined values while the air supply fan (26) and the exhaust fan (25) are under the constant airflow rate control. This can prevent the determiner (103) from making an erroneous determination that the air supplying device (90) has turned on, when the rotation speed of the air supply fan (26) varies and increases because of, for example, clog-up of a filter for an air-supply passageway corresponding to the air supply fan (26), or a malfunction of a damper.

BRIEF DESCRIPTION OF THE DRAWINGS

FIG. 2 shows a plan view, a right side view, and a left side view illustrating a schematic configuration of the humidity control and ventilation device.

FIG. 3 shows an operation of the refrigerant circuit in a first refrigeration cycle operation, and the illustration (B) in FIG. 3 shows an operation of the refrigerant circuit in a second refrigeration cycle operation.

DESCRIPTION OF EMBODIMENTS

Embodiments of the present invention will be described in detail hereinafter with reference to the drawings. The embodiments below are merely preferred examples in nature, and are not intended to limit the scope, applications, and use of the present invention.

First Embodiment

Figure 1:
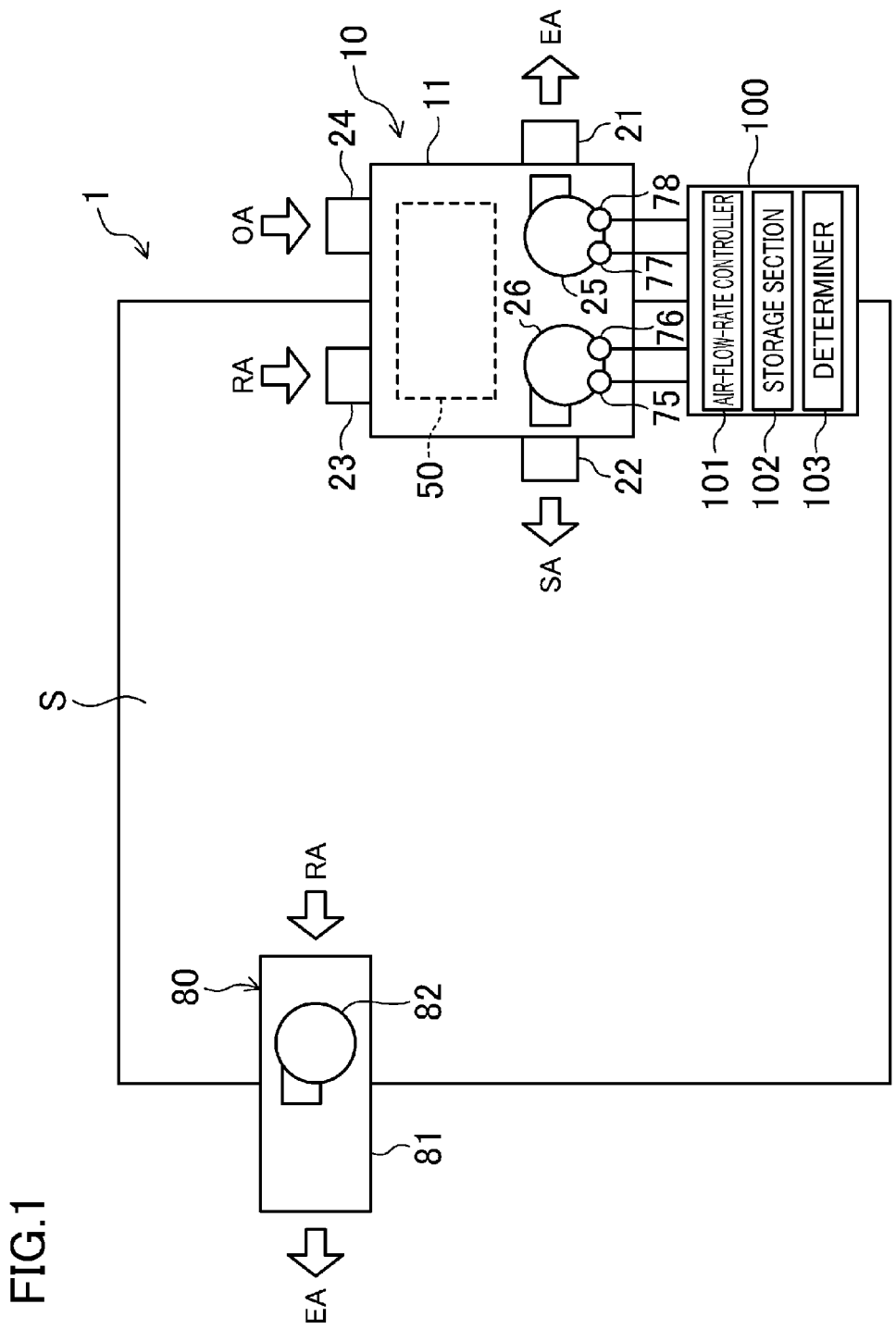
FIG. 1 shows a schematic diagram illustrating a ventilation system according to a first embodiment.

A first embodiment of the present invention will be described below. A ventilation system (1) according to this embodiment includes a humidity control and ventilation device (10), and an exhaust unit (80). As illustrated in FIG. 1, the humidity control and ventilation device (10) and the exhaust unit (80) share a single indoor space (S) as a ventilation target space. It is noted that ventilation target spaces for the ventilation system (1) do not have to be included in the same room. In other words, the ventilation target space (S) can be a space among multiple rooms, such as a space in a house and an office.

—Exhaust Unit—

The exhaust unit (80) is another ventilation device that is different from the humidity control and ventilation device (10), and acts as an air exhausting device to exhaust the room air of the indoor space (S) out of the room. The exhaust unit (80) includes an exhaust duct (81), and an auxiliary exhaust fan (82) provided within the exhaust duct (81). When the auxiliary exhaust fan (82) becomes an operating condition (turns on), room air (RA) in the indoor space (S) is taken into the exhaust duct (81). The air that has passed through the exhaust duct (81) is exhausted out of the room as exhaust air (EA). The exhaust unit (80) switches between the operating condition and the shut-down condition by, for example, a user operating a predetermined on-off switch.

—Humidity Control and Ventilation Device—

The humidity control and ventilation device (10) adjusts temperature and humidity of air to be supplied to the indoor space (S), as well as ventilates the indoor space (S). In other words, the humidity control and ventilation device (10) takes outdoor air (OA) via an outside-air duct (not shown), and controls the humidity of the outdoor air (OA) using a humidity controller (50). The humidity-controlled air is supplied into the room as a supply air (SA) via an air supply duct (not shown). Furthermore, the humidity control and ventilation device (10) takes in the room air (RA) via a room-air duct (not shown). The air is exhausted out of the room as exhaust air (EA) via an exhaust duct (not shown).

(Overall Configuration of Humidity Control and Ventilation Device)

The overall configuration of the humidity control and ventilation device (10) will be described, with reference to FIG. 2. It is noted that the terms "upper", "lower", "left", "right", "front", "rear", "near", and "far" as used herein are directions when the humidity control and ventilation device (10) is viewed from an front surface panel part (12), which will be described later, unless otherwise specified.

The humidity control and ventilation device (10) includes a casing (11). The casing (11) accommodates a refrigerant circuit (50). This refrigerant circuit (50) is connected to a first adsorption heat exchanger (51), a second adsorption heat exchanger (52), a compressor (53), a four-way switching valve (54), and an electric expansion valve (55). Details of the refrigerant circuit (50) will be described later.

The casing (11) is shaped into a cuboid whose height is relatively low. The casing (11) has an outside-air inlet (24), a room-air inlet (23), an air supply opening (22), and an exhaust opening (21).

The outside-air inlet (24) and the room-air inlet (23) are open on a rear surface panel part (13). The outside-air inlet (24) is open on a lower portion of the rear surface panel part (13). The room-air inlet (23) is open on an upper portion of the rear surface panel part (13). The air supply opening (22) is open on a first side surface panel part (14) of the casing (11). On the first side surface panel part (14), the air supply opening (22) is open near an end portion to the front surface panel part (12) of the casing (11). The exhaust opening (21) is open on a second side surface panel part (15) of the casing (11). On the second side surface panel part (15), the exhaust opening (21) is open near an end portion to the front surface panel part (12).

The air supply opening (22) and the room-air inlet (23) each communicate with the indoor space (S) via a duct. The indoor space (S) with which the air supply opening (22) and the room-air inlet (23) communicate is the same as the indoor space (S) into which the exhaust unit (80) sucks air. In contrast, the exhaust opening (21) and the outside-air inlet (24) each communicate with an outdoor space via a duct.

The casing (11) is provided with, in its internal space, an upstream partition (16), a downstream partition (17), and a center partition (18). These partitions (16 to 18) are each provided upright on a bottom plate of the casing (11) to partition the internal space of the casing (11) from the bottom plate to a top plate of the casing (11).

The upstream partition (16) and the downstream partition (17) are placed in parallel with the front surface panel part (12) and the rear surface panel part (13) at a predetermined interval in the front-rear direction of the casing (11). The upstream partition (16) is placed near the rear surface panel part (13). The downstream partition (17) is placed near the front surface panel part (12). Arrangement of the center partition (18) will be described later.

In the casing (11), a space between the upstream partition (16) and the rear surface panel part (13) is partitioned into two spaces; namely, an upper space and a lower space. The upper space defines a room-air passageway (32), and the lower space defines an outside-air passageway (34). The room-air passageway (32) communicates with the room-air inlet (23), and the outside-air passageway (34) communicates with the outside-air inlet (24).

The room-air passageway (32) is provided with a room-air filter (27), a room-air temperature sensor (71), and a room-air humidity sensor (72). The room-air temperature sensor (71) measures temperature of room air that flows through the room-air passageway (32). The room-air humidity sensor (72) measures relative humidity of room air that flows through the room-air passageway (32). In contrast, the outside-air passageway (34) is provided with an outside-air filter (28), an outside-air temperature sensor (73), and an outside-air humidity sensor (74). The outside-air temperature sensor (73) measures temperature of outdoor air that flows through the outside-air passageway (34). The outside-air humidity sensor (74) measures relative humidity of outdoor air that flows through the outside-air passageway (34). It is noted that, in FIGS. 4 to 7, the illustrations of the room-air temperature sensor (71), the room-air humidity sensor (72), the outside-air temperature sensor (73), and the outside-air humidity sensor (74) are omitted.

In the casing (11), the space between the upstream partition (16) and the downstream partition (17) is partitioned into a right space and a left space by the center partition (18). The space on the right of the center partition (18) defines a first heat exchanger chamber (37), and the space on the left of the center partition (18) defines a second heat exchanger chamber (38). The first heat exchanger chamber (37) accommodates the first adsorption heat exchanger (51). The second heat exchanger chamber (38) accommodates the second adsorption heat exchanger (52). Although not shown, the first heat exchanger chamber (37) accommodates the electric expansion valve (55) of the refrigerant circuit (50).

Each adsorption heat exchanger (51, 52) is a cross-fin-type fin-and-tube heat exchanger whose surface has an adsorbent. As a whole, each adsorption heat exchanger (51, 52) is shaped into a rectangular thick plate or a flattened cuboid. Then each adsorption heat exchanger (51, 52) is provided upright in a corresponding one of the first and second heat exchangers (37, 38) such that a front surface and a rear, surface of the adsorption heat exchanger (51, 52) are placed in parallel with the upstream partition (16) and the downstream partition (17).

Of the internal space of the casing (11), a space along the front surface of the downstream partition (17) is partitioned into an upper space and a lower space. Of the space partitioned into two, the upper space defines an air-supply passageway (31), and the lower space defines an exhaust passageway (33).

The upstream partition (16) is provided with four dampers (41 to 44) that open and close. Each damper (41 to 44) is shaped into an approximately horizontally long rectangle. Specifically, a portion (upper portion) included in the upstream partition (16) and facing the room-air passageway (32) has a first room-air damper (41) attached to the rightward of the center partition (18), and a second room-air damper (42) attached to the leftward of the center partition (18). Furthermore, a portion (lower portion) included in the upstream partition (16) and facing the outside-air passageway (34) has a first outside-air damper (43) attached to the rightward of the center partition (18), and a second outside-air damper (44) attached to the leftward of the center partition (18). The four dampers (41 to 44) provided to the upstream partition (16) each act as a switching mechanism (40) to switch air passageways.

The downstream partition (17) is provided with four dampers (45 to 48) that open and close. Each damper (45 to 48) is shaped into an approximately horizontally long rectangle. Specifically, a portion (upper portion) included in the downstream partition (17) and facing the air-supply passageway (31) has a first air-supply damper (45) attached to the rightward of the center partition (18), and a second air-supply damper (46) attached to the leftward of the center partition (18). Furthermore, a portion (lower portion) included in the downstream partition (17) and facing the exhaust passageway (33) has a first exhaust damper (47) attached to the rightward of the center partition (18), and a second exhaust damper (48) attached to the leftward of the center partition (18). The four dampers (45 to 48) provided to the downstream partition (17) each act as a switching mechanism (40) to switch air passageways.

In the casing (11), a space between the air-supply and exhaust passageways (31, 33) and the front surface panel part (12) is horizontally partitioned by a partition (19) into two spaces. The space to the right of the partition (19) defines an air-supply fan chamber (36), and the space to the left of the partition (19) defines an exhaust-fan chamber (35).

The air-supply fan chamber (36) accommodates an air supply fan (26). In addition, the exhaust-fan chamber (35) accommodates an exhaust fan (25). Both the air supply fan (26) and the exhaust fan (25) are centrifugal multiblade fans (so-called sirocco fans). The air supply fan (26) sucks air at the downstream partition (17), and blows the air to the air supply opening (22). The exhaust fan (25) sucks air from the downstream partition (17), and blows the air to the exhaust opening (21). The air supply fan (26) and the exhaust fan (25) are each driven by a DC motor that is an electric motor.

The air-supply fan chamber (36) accommodates the compressor (53) and the four-way switching valve (54) of the refrigerant circuit (50). The compressor (53) and the four-way switching valve (54) are placed between the air supply fan (26) and the partition (19) both included in the air-supply fan chamber (36).

<Configuration of Refrigerant Circuit>

Figure 3B:
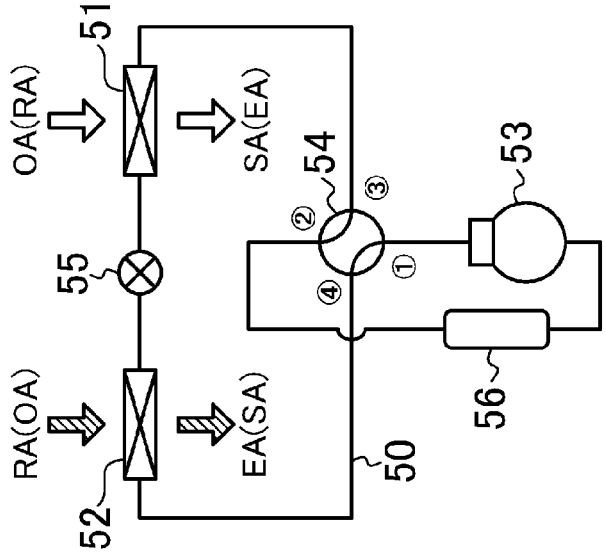
FIG. 3 shows a piping system diagram illustrating a configuration of a refrigerant circuit. The illustration in (A)
Figure 3A:
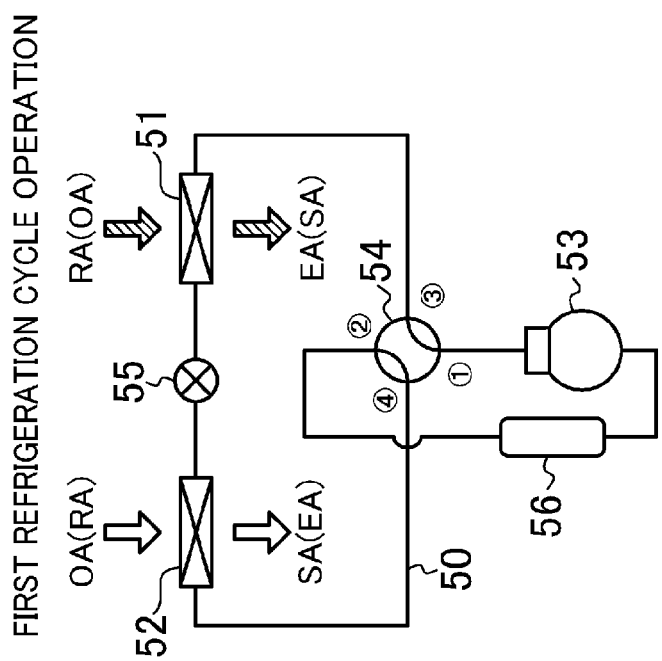

The refrigerant circuit (50) acts as a humidity controller for controlling the humidity of air to be supplied to the indoor space (S). As illustrated in FIG. 3, the refrigerant circuit (50) is a closed circuit provided with the first adsorption heat exchanger (51), the second adsorption heat exchanger (52), the compressor (53), the four-way switching valve (54), and the electric expansion valve (55). This refrigerant circuit (50) executes a vapor-compression refrigeration cycle by circulating a refrigerant that fills the refrigerant circuit (50).

In the refrigerant circuit (50), the compressor (53) has its discharge side connected to a first port of the four-way switching valve (54), and its suction side connected to a second port of the four-way switching valve (54). Moreover, the refrigerant circuit (50) is provided with the first adsorption heat exchanger (51), the electric expansion valve (55), and the second adsorption heat exchanger (52) in the stated order from the third port to the fourth port.

The four-way switching valve (54) can switch between two states: a first state (the state shown in the illustration (A) in FIG. 3) where the first port and the third port communicate with each other, and the second port and the fourth port communicate with each other; and a second state (the state shown in the illustration (B) in FIG. 3) where the first port and the fourth port communicate with each other, and the second port and the third port communicate with each other.

The compressor (53) is a hermetic compressor that accommodates, in a single casing, a compression mechanism and an electric motor that drives the compression mechanism. The electric motor of the compressor (53) receives an alternate current via an inverter. A change in an output frequency of the inverter (in other words, an operation frequency of the compressor) changes rotation speeds of the electric motor and the compression mechanism driven by the electric motor, leading to a change in operation capacity of the compressor (53).

<Configurations of Other Sensors and Controller>

As illustrated in FIG. 1, the humidity control and ventilation device (10) includes an air-supply rotation speed detector (75), an air-supply power detector (76), an exhaust rotation speed detector (77), and an exhaust power detector (78). The air-supply rotation speed detector (75) measures a rotation speed of a motor of the air supply fan (26). The air-supply power detector (76) measures power consumption of the motor of the air supply fan (26). The exhaust rotation speed detector (77) measures the rotation speed of a motor of the exhaust fan (25). The exhaust power detector (78) measures power consumption of the motor of the exhaust fan (25).

The humidity control and ventilation device (10) is provided with a controller (100) (see FIG. 1). The controller (100) receives measurements taken by the room-air humidity sensor (72), the room-air temperature sensor (71), the outside-air humidity sensor (74), and the outside-air temperature sensor (73). Furthermore, the controller (100) receives measurements taken by a temperature sensor and a pressure sensor provided to the refrigerant circuit (50). Based on these measurements, the controller (100) adjusts the capability of the humidity control and ventilation device (10) for controlling humidity in the air.

The controller (100) is provided with an air-flow-rate controller (101), a storage section (102), and a determiner (103).

The air-flow-rate controller (101) adjusts the rotation speeds of the air supply fan (26) and the exhaust fan (25), based on the measurements taken by the air-supply power detector (76), the exhaust rotation speed detector (77), and the exhaust power detector (78). Specifically, the air-flow-rate controller (101) selectively executes the constant airflow rate control and the constant rotation speed control. The constant airflow rate control involves adjusting the speeds of the motors to bring the airflow rates of the air supply fan (26) and the exhaust fan (25) close to respective predetermined target rotation speeds. The target airflow rate of the air supply fan (26) and that of the exhaust fan (25) are basically set to the same value. In addition, the constant rotation speed control involves adjusting the rotation speeds of the motors such that the rotation speeds of the air supply fan (26) and the exhaust fan (25) keep a predetermined target rotation speed.

The storage section (102) of the controller (100) stores data where the power consumption of each motor, the rotation speed of each motor, and the airflow rate of each fan (26, 27) are associated with one another. In the constant airflow rate control, the air-flow-rate controller (101) calculates an integrated value of the power consumption at a predetermined interval. Then, based on the data stored in the storage section (102), the air-flow-rate controller (101) determines the rotation speed of each fan (26, 27) such that the calculated integrated value of the power consumption becomes a value of required power for a previously set target airflow rate.

The determiner (103) according to this embodiment determines whether the exhaust unit (80) is on or off. Specifically, while the humidity control and ventilation device (10) is executing constant airflow rate control, the determiner (103) determines that the exhaust unit (80) has switched from off to on based on the rotation speeds of the motors of the exhaust fan (25) and the air supply fan (26).

In contrast, when the determiner (103) determines that the exhaust unit (80) has turned on, the air-flow-rate controller (101) executes the constant rotation speed control such that the airflow rate of the exhaust fan (25) becomes lower. In other words, if the determiner (80) determines that the exhaust unit (80) has turned on, the air-flow-rate controller (101) decreases the rotation speed of the exhaust fan (25) such that the total air supply rate and the total air exhaust rate in the entire ventilation target space (S) are balanced with each other. Moreover, while the humidity control and ventilation device (10) is executing the constant rotation speed control, the determiner (103) determines that the exhaust unit (80) has switched from on to off based on the amounts of change in the power consumption of the motors of the exhaust fan (25) and the air supply fan (26). Then, if the exhaust unit (80) is determined to have turned off under the constant rotation speed control, the air-flow-rate controller (101) changes from the constant rotation speed control to the constant airflow rate control. Details of such airflow rate control will be described later.

—Operation of Humidity Control and Ventilation Device—

The humidity control and ventilation device (10) according to this embodiment can operate in a dehumidification mode and a humidification mode. In the dehumidification mode and the humidification mode, the air supply fan (26) and the exhaust fan (25) operate. Then the humidity control and ventilation device (10) supplies taken outdoor air (OA) to the indoor space (S) as supply air (SA), and exhausts taken room air (RA) to an outdoor space as exhaust air (EA).

<Dehumidification Mode>

The humidity control and ventilation device (10) in the dehumidification mode takes the outdoor air as first air from the outside-air inlet (24) into the casing (11), and takes the room air as second air from the room-air inlet (23) into the casing (11). Moreover, in the refrigerant circuit (50), the compressor (53) operates, and an openness degree of the electric expansion valve (55) is adjusted. Then the humidity control and ventilation device (10) in the dehumidification mode alternately executes the later-described first operation and second operation each for three minutes.

First, the first operation in the dehumidification mode will be described.

Figure 4:
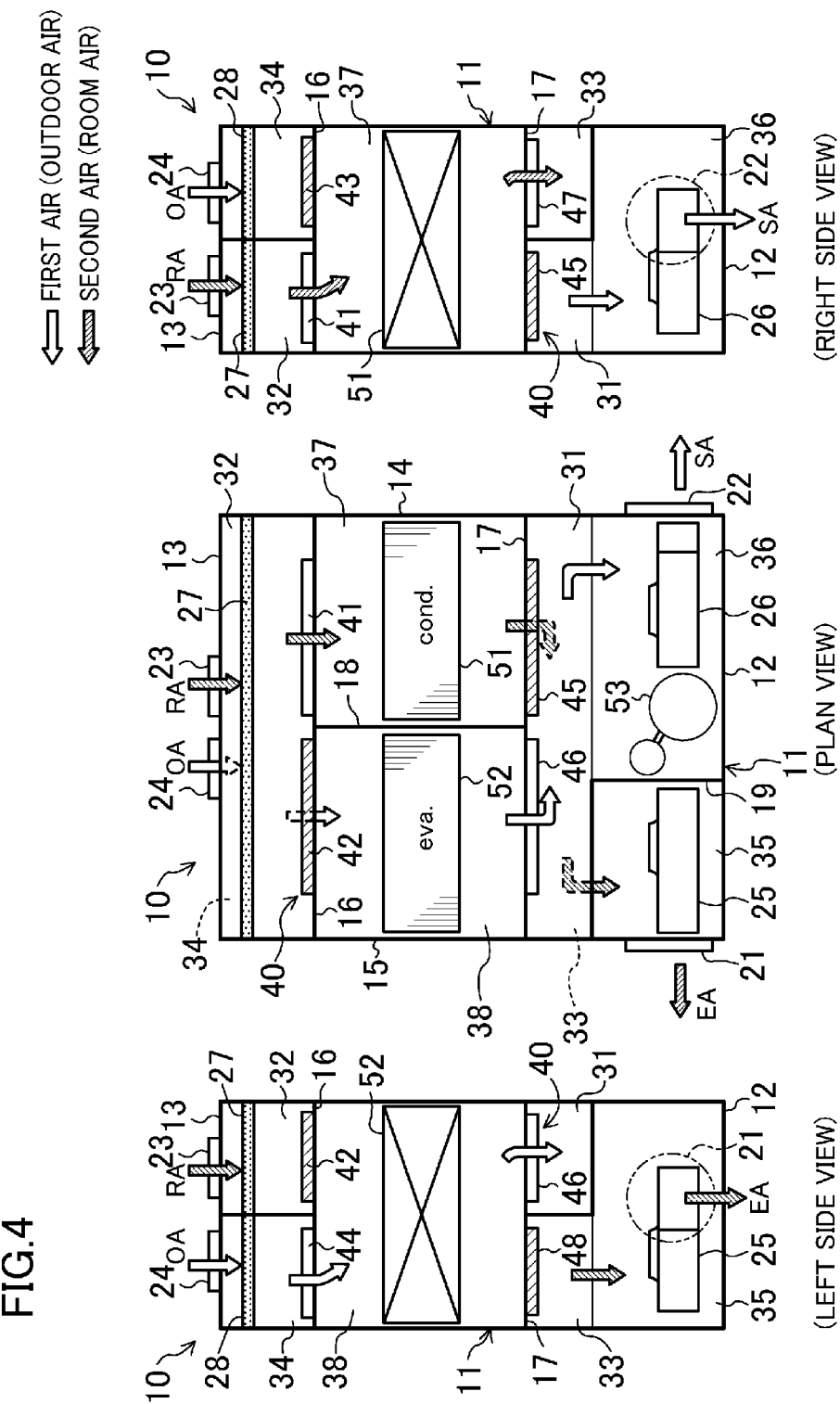
FIG. 4 shows a schematic plan view, a schematic right side view, and a schematic left side view of the humidity control and ventilation device, illustrating an airflow during a first operation in a dehumidification mode.

As illustrated in FIG. 4, in the first operation in the dehumidification mode, the switching mechanism (40) determines an air passageway as a second passageway. Specifically, the first room-air damper (41), the second outside-air damper (44), the second air-supply damper (46), and the first exhaust damper (47) are open, and the second room-air damper (42), the first outside-air damper (43), the first air-supply damper (45), and the second exhaust damper (48) are closed. Moreover, in the first operation, the refrigerant circuit (50) executes a first refrigeration cycle operation. In other words, in the refrigerant circuit (50), the four-way switching valve (54) is set to a first state (the state in the illustration (A) in FIG. 3), the first adsorption heat exchanger (51) acts as a condenser, and the second adsorption heat exchanger (52) acts as an evaporator.

The first air, which flows into the outside-air passageway (34) and passes through the outside-air filter (28), flows through the second outside-air damper (44) into the second heat exchanger chamber (38), and then passes through the second adsorption heat exchanger (52). In the second adsorption heat exchanger (52), moisture in the first air is adsorbed onto the adsorbent. Then the resulting adsorption heat, generated in the adsorption, is absorbed into the refrigerant. The first air, which is dehumidified by the second adsorption heat exchanger (52), flows through the second air-supply damper (46) into the air-supply passageway (31), and passes through the air-supply fan chamber (36). Then, through the air supply opening (22), the first air is supplied to the indoor space (S).

In contrast, the second air, which flows into the room-air passageway (32) and passes through the room-air filter (27), flows through the first room-air damper (41) into the first heat exchanger chamber (37), and then passes through the first adsorption heat exchanger (51). In the first adsorption heat exchanger (51), moisture desorbs from the adsorbent heated by the refrigerant. The desorbing moisture is released into the second air. The second air, which receives the moisture from the first adsorption heat exchanger (51), flows through the first exhaust damper (47) into the exhaust passageway (33), and passes through the exhaust-fan chamber (35). Then, through the exhaust opening (21), the second air is exhausted to the outdoor space.

Next, the second operation in the dehumidification mode will be described.

Figure 5:
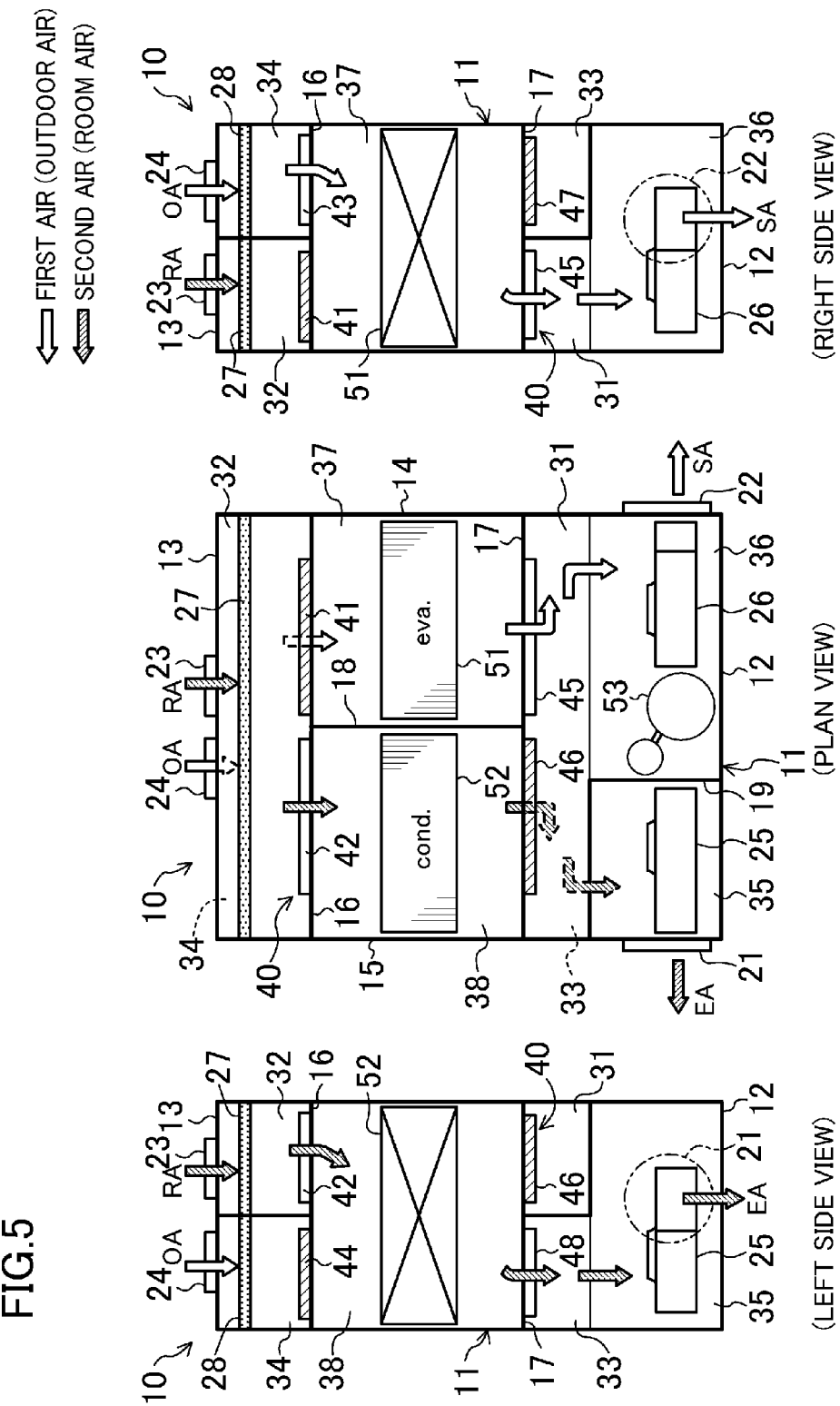
FIG. 5 shows a schematic plan view, a schematic right side view, and a schematic left side view of the humidity control and ventilation device, illustrating airflow during a second operation in the dehumidification mode.

As illustrated in FIG. 5, in the second operation in the dehumidification mode, the switching mechanism (40) determines an air passageway as first passageway. Specifically, the second room-air damper (42), the first outside-air damper (43), the first air-supply damper (45), and the second exhaust damper (48) are open, and the first room-air damper (41), the second outside-air damper (44), the second air-supply damper (46), and the first exhaust damper (47) are closed. Moreover, in the second operation, the refrigerant circuit (50) executes a second refrigeration cycle operation. In other words, in the refrigerant circuit (50), the four-way switching valve (54) is set to a second state (the state in the illustration (B) in FIG. 3), the first adsorption heat exchanger (51) acts as an evaporator, and the second adsorption heat exchanger (52) acts as a condenser.

The first air, which flows into the outside-air passageway (34) and passes through the outside-air filter (28), flows through the first outside-air damper (43) into the first heat exchanger chamber (37), and then passes through the first adsorption heat exchanger (51). In the first adsorption heat exchanger (51), moisture in the first air is adsorbed onto the adsorbent. Then the resulting adsorption heat, generated in the adsorption, is absorbed into the refrigerant. The first air, which is dehumidified by the first adsorption heat exchanger (51), flows through the first air-supply damper (45) into the air-supply passageway (31), and passes through the air-supply fan chamber (36). Then, through the air supply opening (22), the first air is exhausted to the indoor space (S).

In contrast, the second air, which flows into the room-air passageway (32) and passes through the room-air filter (27), flows through the second room-air damper (42) into the second heat exchanger chamber (38), and then passes through the second adsorption heat exchanger (52). In the second adsorption heat exchanger (52), moisture desorbs from the adsorbent heated by the refrigerant. The desorbing moisture is released into the second air. The second air, which receives the moisture from the second adsorption heat exchanger (52), flows through the second exhaust damper (48) into the exhaust passageway (33), and passes through the exhaust-fan chamber (35). Then, through the exhaust opening (21), the second air is exhausted to the outdoor space.

<Humidification Mode>

The humidification mode involves humidifying outdoor air that the humidity control and ventilation device (10) sucks, and supplying the sucked outdoor air into the room. Moreover, the humidity control and ventilation device (10) in the humidification mode heats the outdoor air. In other words, this humidification mode is a heating mode in which the humidity control and ventilation device (10) heats outdoor air.

The humidity control and ventilation device (10) in the humidification mode takes the outdoor air as the second air from the outside-air inlet (24) into the casing (11), and takes the room air as the first air from the room-air inlet (23) into the casing (11). Moreover, in the refrigerant circuit (50), the compressor (53) operates, and an openness degree of the electric expansion valve (55) is adjusted. Then the humidity control and ventilation device (10) in the humidification mode alternately executes the later-described first operation and second operation for a predetermined switching time period. In the humidification mode, the time interval (in other words, the switching time period) at which the first operation and the second operation switch is adjusted by the controller (100).

First, the first operation in the humidification mode will be described.

Figure 6:
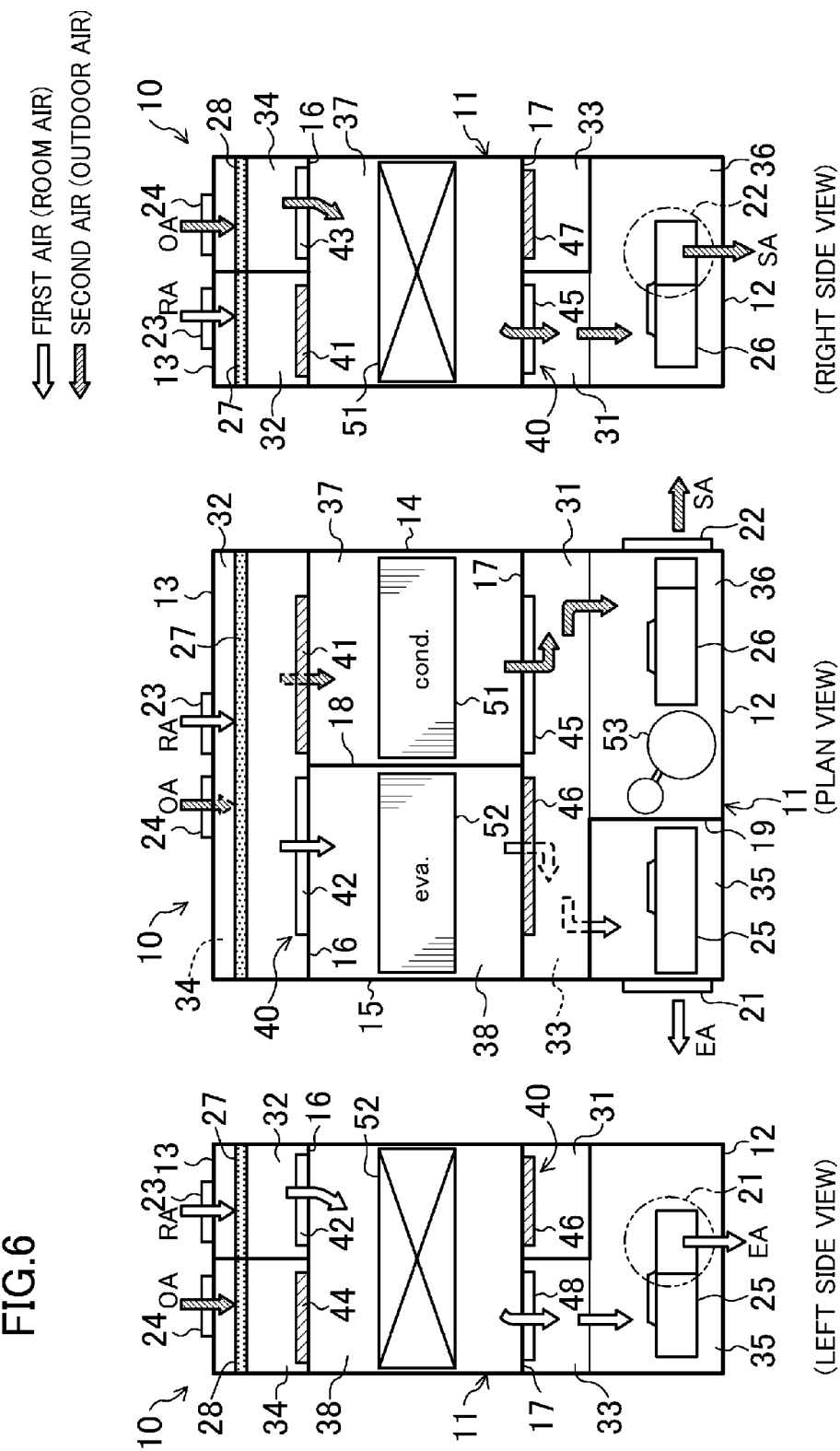
FIG. 6 shows a schematic plan view, a schematic right side view, and a schematic left side view of the humidity control and ventilation device, illustrating airflow during a first operation in a humidification mode.

As illustrated in FIG. 6, the switching mechanism (40) in the first operation in the humidification mode determines an air passageway as the first passageway. Specifically, the second room-air damper (42), the first outside-air damper (43), the first air-supply damper (45), and the second exhaust damper (48) are open, and the first room-air damper (41), the second outside-air damper (44), the second air-supply damper (46), and the first exhaust damper (47) are closed. Moreover, the refrigerant circuit (50) executes the first refrigeration cycle operation in the first operation. In other words, in the refrigerant circuit (50), the four-way switching valve (54) is set to the first state (the state in the illustration (B) in FIG. 3), the first adsorption heat exchanger (51) acts as a condenser, and the second adsorption heat exchanger (52) acts as an evaporator.

The first air, which flows into the room-air passageway (32) and passes through the room-air filter (27), flows through the second room-air damper (42) into the second heat exchanger chamber (38), and then passes through the second adsorption heat exchanger (52). In the second adsorption heat exchanger (52), moisture in the first air is adsorbed onto the adsorbent. Then the resulting adsorption heat, generated in the adsorption, is absorbed into the refrigerant. The first air, which is dehumidified by the second adsorption heat exchanger (52), flows through the second exhaust damper (48) into the exhaust passageway (33), and passes through the exhaust-fan chamber (35). Then, through the exhaust opening (21), the first air is exhausted to the outdoor space.

In contrast, the second air, which flows into the outside-air passageway (34) and passes through the outside-air filter (28), flows through the first outside-air damper (43) into the first heat exchanger chamber (37), and then passes through the first adsorption heat exchanger (51). In the first adsorption heat exchanger (51), moisture desorbs from the adsorbent heated by the refrigerant. The desorbing moisture is released into the second air. The second air, which is humidified by the first adsorption heat exchanger (51), flows through the first air-supply damper (45) into the air-supply passageway (31), and passes through the air-supply fan chamber (36). Then, through the air supply opening (22), the second air is supplied to the indoor space (S).

Next, the second operation in the humidification mode will be described.

Figure 7:
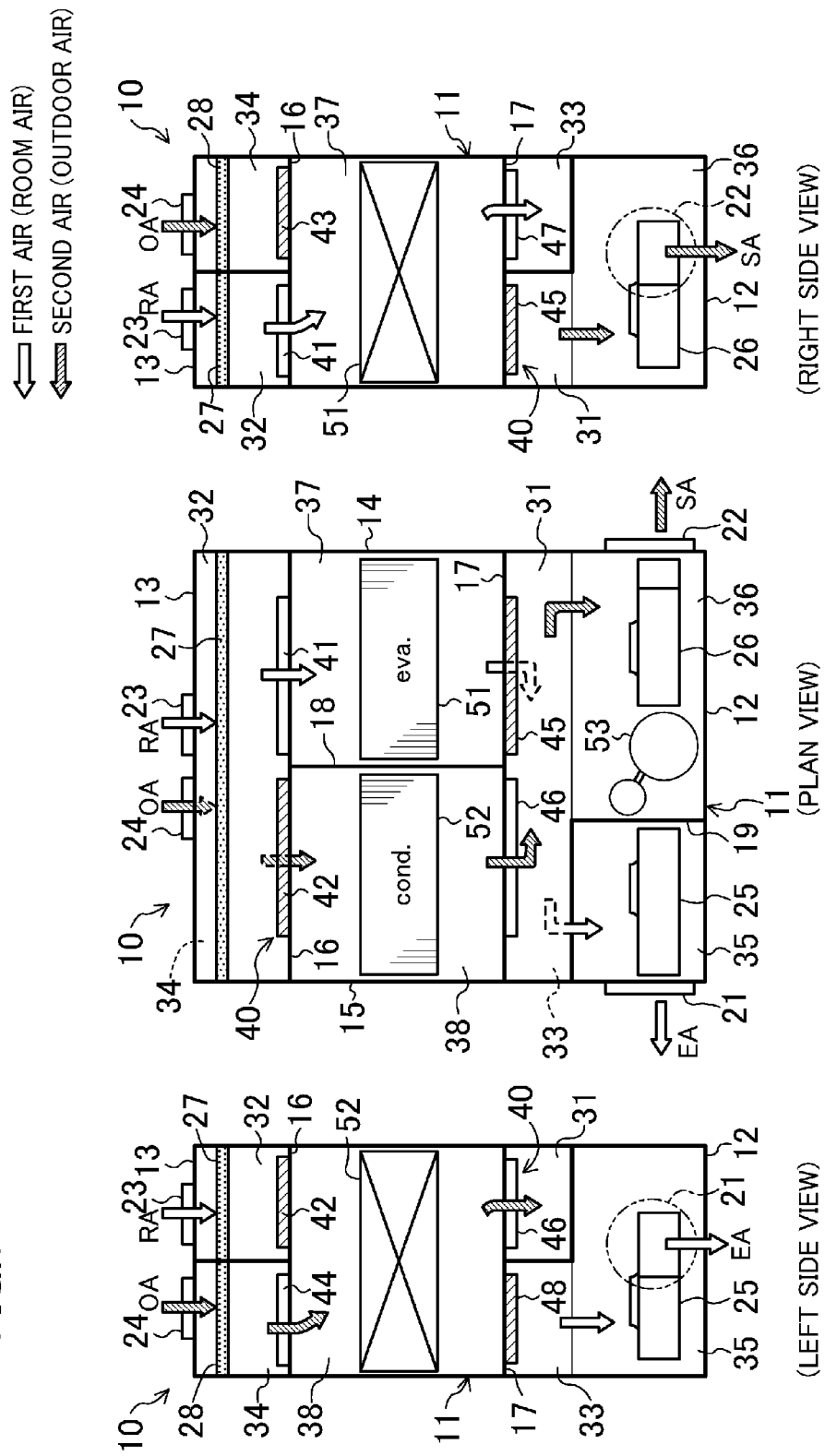
FIG. 7 shows a schematic plan view, a schematic right side view, and a schematic left side view of the humidity control and ventilation device, illustrating airflow during a second operation in the humidification mode.

As illustrated in FIG. 7, the switching mechanism (40) in the second operation in the humidification mode sets an air passageway to the second passageway. Specifically, the first room-air damper (41), the second outside-air damper (44), the second air-supply damper (46), and the first exhaust damper (47) are open, and the second room-air damper (42), the first outside-air damper (43), the first air-supply damper (45), and the second exhaust damper (48) are closed. Moreover, the refrigerant circuit (50) executes the second refrigeration cycle operation in the second operation. In other words, in the refrigerant circuit (50), the four-way switching valve (54) is set to the second state (the state in the illustration (B) in FIG. 3), the first adsorption heat exchanger (51) acts as an evaporator, and the second adsorption heat exchanger (52) acts as a condenser.

The first air, which flows into the room-air passageway (32) and passes through the room-air filter (27), flows through the first room-air damper (41) into the first heat exchanger chamber (37), and then passes through the first adsorption heat exchanger (51). In the first adsorption heat exchanger (51), moisture in the first air is adsorbed onto the adsorbent. Then the resulting adsorption heat, generated in the adsorption, is absorbed into the refrigerant. The first air, which is dehumidified by the first adsorption heat exchanger (51), flows through the first exhaust damper (47) into the exhaust passageway (33), and passes through the exhaust-fan chamber (35). Then, through the exhaust opening (21), the first air is exhausted to the outdoor space.

In contrast, the second air, which flows into the outside-air passageway (34) and passes through the outside-air filter (28), flows through the second outside-air damper (44) into the second heat exchanger chamber (38), and then passes through the second adsorption heat exchanger (52). In the second adsorption heat exchanger (52), moisture desorbs from the adsorbent heated by the refrigerant. The desorbing moisture is released into the second air. The second air, which is humidified by the second adsorption heat exchanger (52), flows through the second air-supply damper (46) into the air-supply passageway (31), and passes through the air-supply fan chamber (36). Then, through the air supply opening (22), the second air is supplied to the indoor space (S).

—Airflow Rate Control in conjunction with Operation of Exhaust Unit—

Next, airflow rate control by the humidity control and ventilation device (10) in conjunction with the operation of the exhaust unit (80) will be described, with reference to FIGS. 8 and 9.

When the above-described dehumidification mode and humidification mode start, the air-flow-rate controller (101) of the humidity control and ventilation device (10) controls the motors of the air supply fan (26) and the exhaust fan (25) to bring an airflow rate of the air supply fan (26) close to a target airflow rate (target supply airflow rate V-s) and an airflow rate of the exhaust fan (25) close to a target airflow rate (target exhaust airflow rate V-e) (Step (St)1). In other words, when the humidity control and ventilation device (10) starts operating, the air supply fan (26) and the exhaust fan (25) execute the constant airflow rate control. It is noted that each airflow rate of the air supply fan (26) and the exhaust fan (25) is updated and adjusted at a predetermined control interval (an interval between each dashed line illustrated in FIG. 9).

Figure 9:
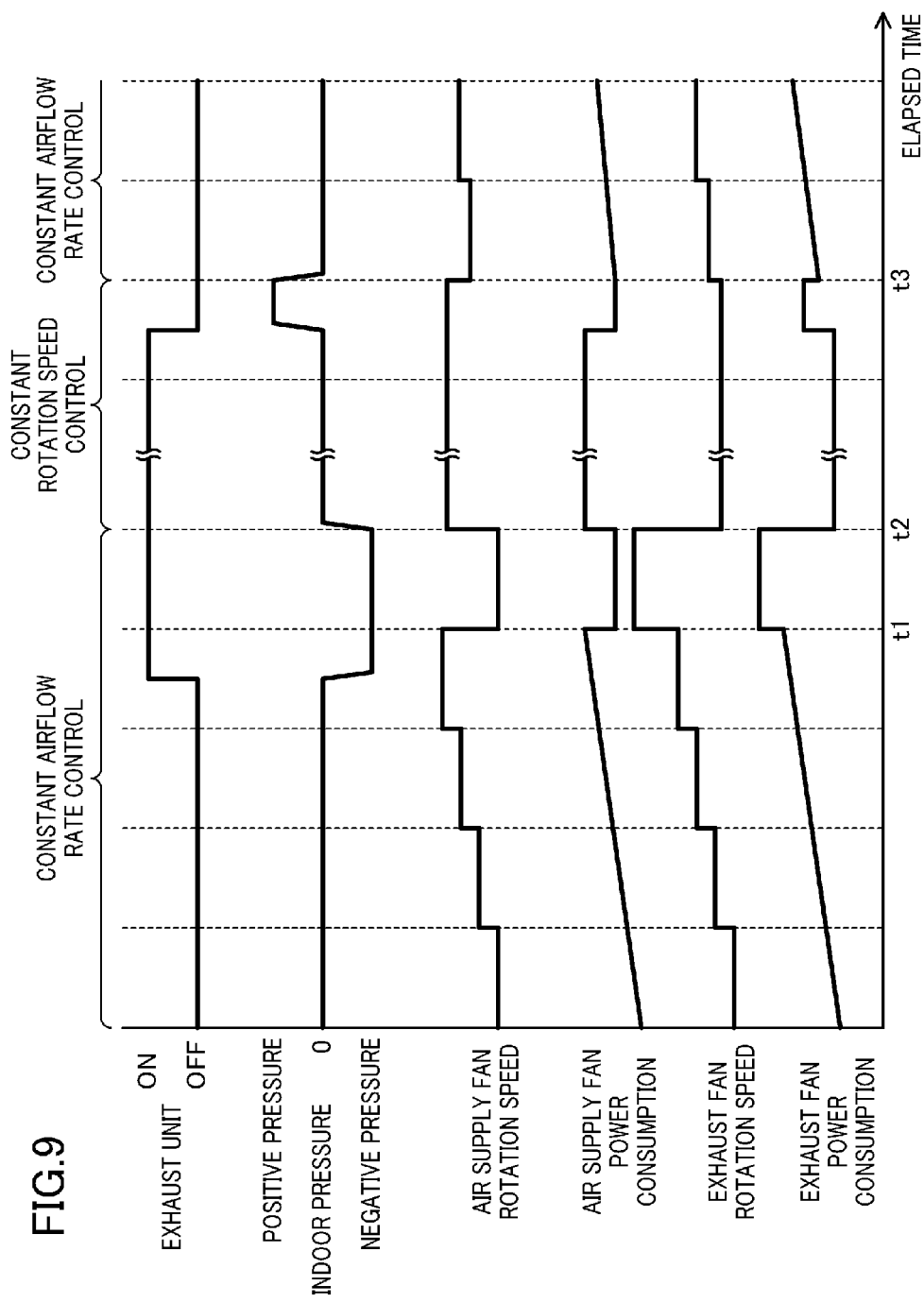
FIG. 9 shows a timing diagram of the airflow rate control according to the first embodiment.

Under the constant airflow rate control, suppose a user turns the exhaust unit (80) on from off immediately before an update time t1 illustrated in FIG. 9. Then the auxiliary exhaust fan (82) in the exhaust unit (80) operates to suck the room air (RA) in the indoor space (S) into the exhaust duct (81) and to exhaust the sucked room air (RA) out of the room as the exhaust air (EA). The resulting pressure in the indoor space (S) decreases to be negative pressure.

The negative pressure in the indoor space (S) increases the airflow resistance of the exhaust fan (25) in the humidity control and ventilation device (10). Under the constant airflow rate control, this exhaust fan (25) is controlled to bring its airflow rate close to the target exhaust airflow rate V-e. Hence, at the update time t1 immediately after the exhaust unit (80) turns on, the motor rotation speed of the exhaust fan (25) drastically varies and increases.

The negative pressure in the indoor space (S) decreases the airflow resistance of the air supply fan (26) in the humidity control and ventilation device (10). Under the constant airflow rate control, this air supply fan (26) is controlled to bring its airflow rate close to the target supply airflow rate V-s. Hence, at the update time t1 immediately after the exhaust unit (80) turns on, the motor rotation speed of the exhaust fan (26) drastically varies and decreases.

The determiner (103) according to this embodiment determines that the exhaust unit (80) has turned on, based on the increasing variation in the motor rotation speed of the exhaust fan (25) and the decreasing variation in the motor rotation speed of the air supply fan (26).

Figure 8:
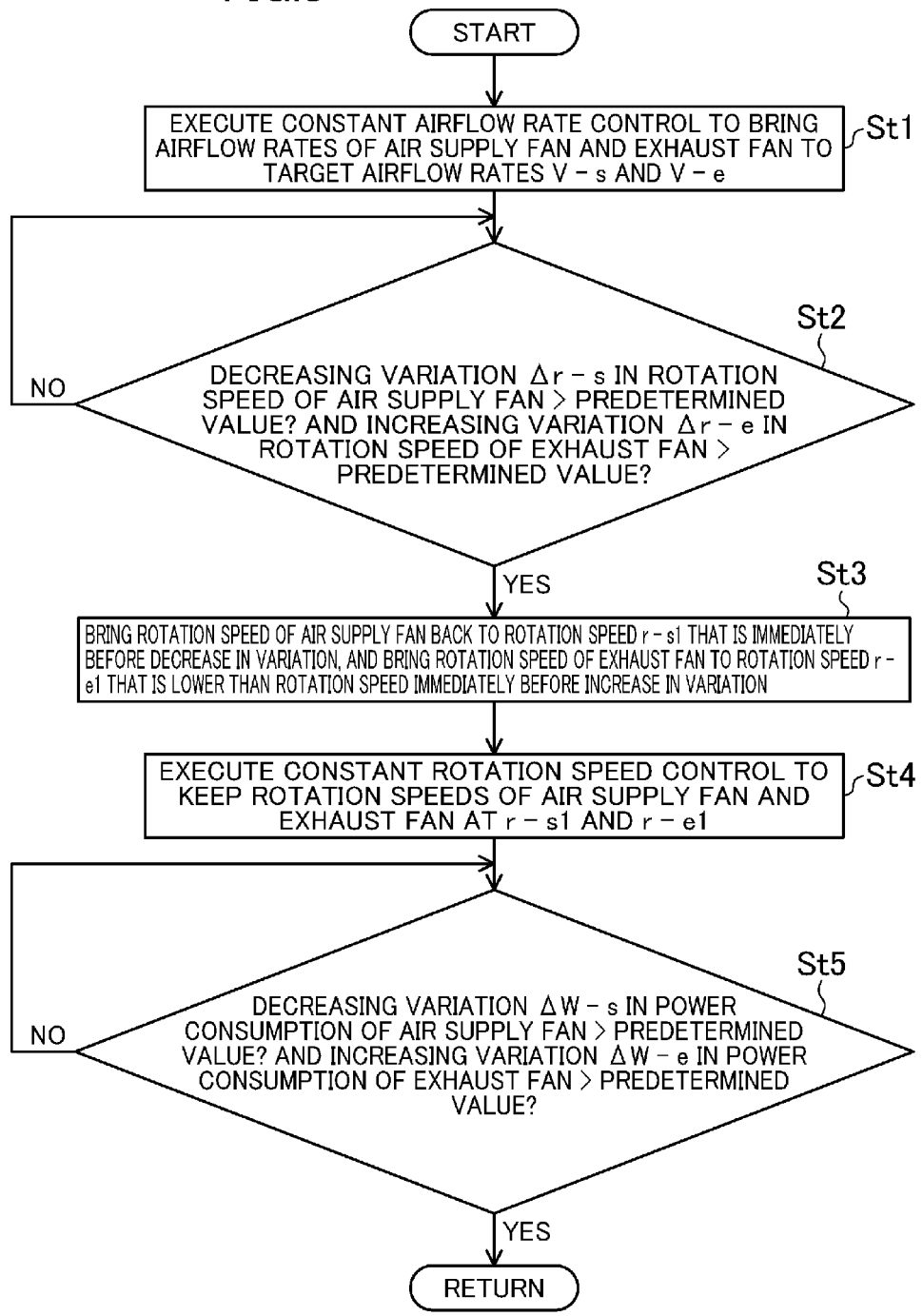
FIG. 8 shows a flowchart of airflow rate control according to the first embodiment.

In other words, the determiner (103) determines in St2 of FIG. 8 whether a decreasing variation Δr-s in the motor rotation speed of the air supply fan (26) exceeds a predetermined value and an increasing variation Δr-e in the motor rotation speed of the exhaust fan (25) exceeds a predetermined value. Then the process proceeds to St3, if, for example at the time t1, the decreasing variation Δr-s in the motor rotation speed of the air supply fan (26) exceeds the predetermined value and the increasing variation Δr-e in the motor rotation speed of the exhaust fan (25) exceeds the predetermined value.

In St3, at the next update time t2, the constant airflow rate control changes to the constant rotation speed control such that the motor rotation speed of the air supply fan (26) is brought to the rotation speed at the update time t1 that is immediately before the update time t2. In other words, after the update time t2, the constant rotation speed control is executed to bring the target motor rotation speed of the air supply fan (26) to a motor rotation speed r-s1 of the air supply fan (26) at the time t1. Simultaneously, in St3, the constant airflow rate control changes to the constant rotation speed control such that the motor rotation speed of the exhaust fan (25) slows down by a predetermined rotation speed at the update time t2 to less than the rotation speed at the update time t1 that is immediately before the update time t2. In other words, after the update time t2, the constant rotation speed control is executed to bring the target motor rotation speed of the exhaust fan (25) to a motor rotation speed r-e1 that is lower than the motor rotation speed of the exhaust fan (25) at the time t1.

As described above, when the constant airflow rate control changes to the constant rotation speed control, the airflow rate of the exhaust fan (25) decreases as the airflow rate of the air supply fan (26) increases. As a result, the pressure in the indoor space (S) comes closer to the atmospheric pressure, preventing an excessive exhaust airflow rate of the exhaust fan (25). In other words, in this embodiment, if the determiner (103) determines that the exhaust unit (80) has turned on, the airflow rate of the exhaust fan (25) immediately falls. Consequently, this achieves reduction in the power of the exhaust fan (25) and improvement in energy conservation.

After St3, the constant rotation speed control is continuously executed to keep the motor rotation speed of the air supply fan (26) at r-s1, and the motor rotation speed of the exhaust fan (25) at r-e1.

Under the constant rotation speed control, suppose the user turns the exhaust unit (80) off from on immediately before an update time t3 indicated in FIG. 9. Then the auxiliary exhaust fan (82) in the exhaust unit (80) stops, and the room air (RA) in the indoor space (S) is not exhausted out of the room. In contrast, under the constant rotation speed control, the motor rotation speed of the exhaust fan (25) is kept lower than that of the air supply fan (26). Hence, when the exhaust unit (80) stops, the pressure in the indoor space (S) increases to be positive pressure.

The positive pressure in the indoor space (S) increases the exhaust airflow rate of the exhaust fan (25), followed by an increase in power consumption of the motor of the exhaust fan (25). In contrast, the supply airflow rate of the air supply fan (26) decreases, followed by a decrease in power consumption of the motor of the air supply fan (26).

The determiner (103) according to this embodiment determines that the exhaust unit (80) has turned off, based on the increasing variation in the motor power consumption of the exhaust fan (25) and the decreasing variation in the motor power consumption of the air supply fan (26).

In other words, the determiner (103) determines in St5 of FIG. 8 whether a decreasing variation ΔW-s in the motor power consumption of the air supply fan (26) exceeds a predetermined value and an increasing variation ΔW-e in the motor power consumption of the exhaust fan (25) exceeds a predetermined value. Then, at the time t3, the process proceeds to St1 if, for example, the decreasing variation ΔW-s in the motor power consumption of the air supply fan (26) exceeds the predetermined value and the increasing variation ΔW-e in the motor power consumption of the exhaust fan (25) exceeds the predetermined value. As a result, the constant rotation speed control changes to the constant airflow rate control, and the rotation speeds of the motors are controlled to bring the airflow rates of the air supply fan (26) and the exhaust fan (25) close to the original target airflow rates V-s and V-e.

As described above, when the constant rotation speed control changes to the constant airflow rate control, the airflow rate of the exhaust fan (25) decreases as the airflow rate of the air supply fan (26) increases. As a result, the pressure in the indoor space (S) comes closer to the atmospheric pressure, preventing an excessive airflow rate of the exhaust fan (25). In other words, in this embodiment, if the determiner (103) determines that the exhaust unit (80) has turned off, the airflow rate of the exhaust fan (25) immediately falls. Consequently, this achieves reduction in the power of the exhaust fan (25) and improvement in energy conservation.

Advantages of First Embodiment

Under the constant airflow rate control in the first embodiment of the humidity control and ventilation device (10), whether the exhaust unit (80) is on or off is determined based on a variation in rotation speed of each fan (26, 27). The airflow rate of the fan (26, 27) is varied based on the result of the determination. This makes it possible to determine whether the exhaust unit (80) is on or off without communications between the humidity control and ventilation device (10) and the exhaust unit (80), contributing to reduction in power of the exhaust fan (25).

Moreover, in St2, the exhaust unit (80) is determined to have turned on if both the increasing variation Δr-e in the motor rotation speed of the exhaust fan (25) and the decreasing variation Δr-s in the motor rotation speed of the air supply fan (26) exceed respective predetermined values. This can prevent the determiner (103) from making an erroneous determination that the exhaust unit (80) has turned on, when the rotation speed of the exhaust fan (25) varies and increases because of, for example, clog-up of the room-air filter (27), a malfunction of each damper (41 to 48), etc.

Furthermore, after the exhaust unit (80) turns on, the constant rotation speed control enables the reduction in the rotation speed of the exhaust fan (25). This makes it possible to immediately reduce the airflow rate of the exhaust fan (25) after the exhaust unit (80) turns on, ensuring the reduction in power of the exhaust fan (25).

Moreover, in the constant rotation speed control, the exhaust unit (80) is determined to have turned off if both the increasing variation ΔW-e in the power consumption of the exhaust fan (25) and the decreasing variation ΔW-s in the power consumption of the air supply fan (26) exceed respective predetermined values. This makes it possible to ensure that the turn-off of the exhaust unit (80) is determined without communications between the humidity control and ventilation device (10) and the exhaust unit (80).

Modifications of First Embodiment

The above-described first embodiment can include modifications below.

In the first embodiment, if the decreasing variation Δr-s in the motor rotation speed of the air supply fan (26) exceeds a predetermined value and the increasing variation Δr-e in the motor rotation speed of the exhaust fan (25) exceeds a predetermined value in St2, the process proceeds to St3 and the airflow rate of the exhaust fan (25) is reduced. In St2, however, if the increasing variation Δr-e in the motor rotation speed of the exhaust fan (25) exceeds the predetermined value regardless of the decreasing variation Δr-s in the motor rotation speed of the air supply fan (26), the process can proceed to St3 and the airflow rate of the exhaust fan (25) can be reduced.

Furthermore, in the first embodiment, if the determiner (103) determines that the exhaust unit (80) is on in St2, the constant airflow rate control changes to the constant rotation speed control and the airflow rate of the exhaust fan (25) is reduced. In St2, however, if the determiner (103) determines that the exhaust unit (80) is on, the target airflow rate of the exhaust fan (25) can be reduced and the constant airflow rate control can be continuously executed. This also makes it possible to immediately reduce the airflow rate of the exhaust fan (25) after the exhaust unit (80) turns on, contributing to the reduction in power of the exhaust fan (25).

In addition, in the first embodiment, if the decreasing variation ΔW-s in the motor power consumption of the air supply fan (26) exceeds a predetermined value and the increasing variation ΔW-e in the motor power consumption of the exhaust fan (25) exceeds a predetermined value in St5, the process proceeds to St1 and the constant rotation speed control changes to the constant airflow rate control. In St5, however, if the increasing variation ΔW-e in the motor power consumption of the exhaust fan (25) exceeds the predetermined value regardless of the decreasing variation ΔW-s in the motor power consumption of the air supply fan (26), the process can proceed to St1 and the constant rotation speed control can change to the constant airflow rate control.

Second Embodiment

Figure 10:
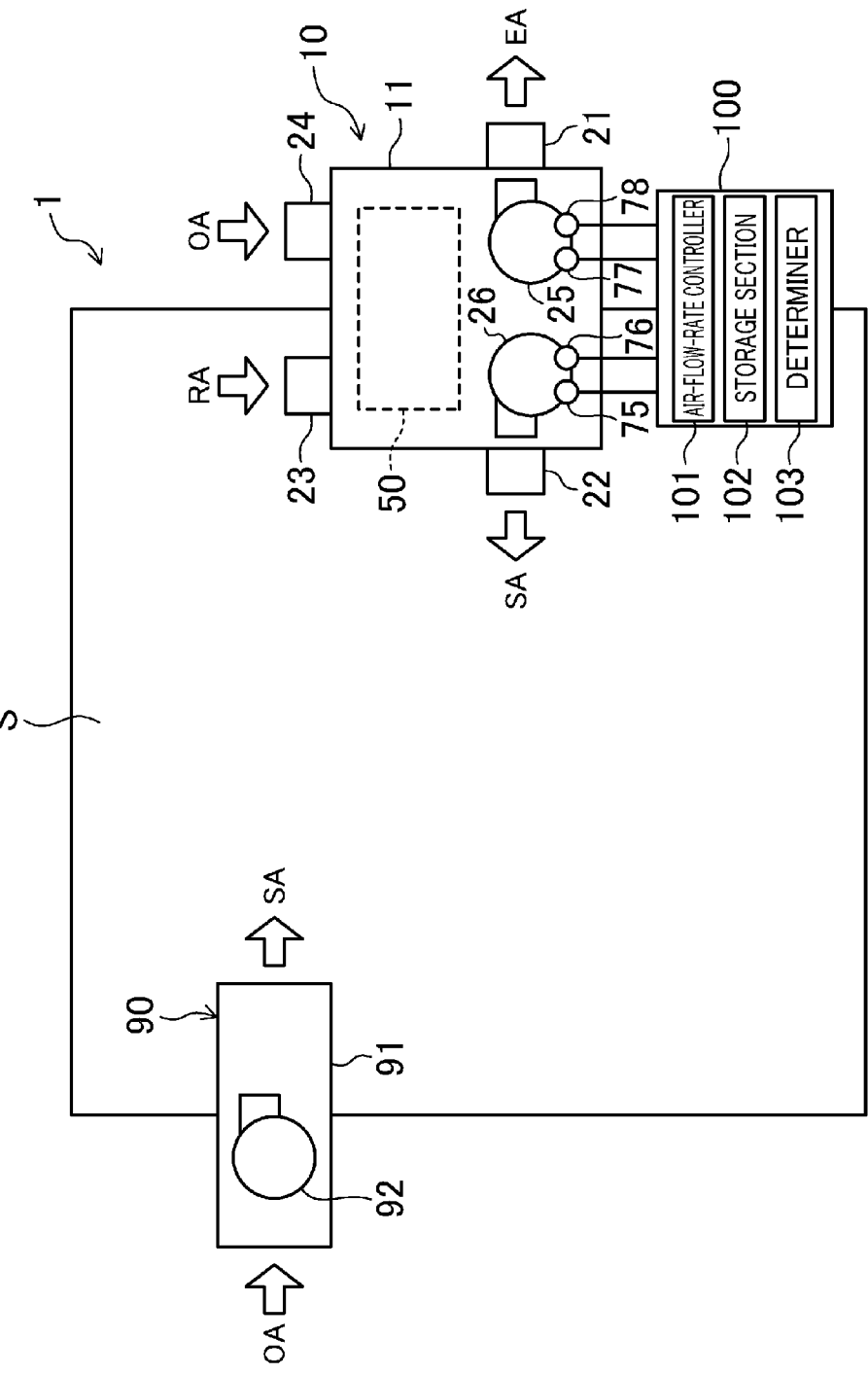
FIG. 10 is a schematic diagram illustrating a ventilation system according to a second embodiment.

A second embodiment of the present invention will be described below. A ventilation system (1) according to this embodiment includes a humidity control and ventilation device (10), and an air supply unit (90). As illustrated in FIG. 10, the humidity control and ventilation device (10) and the air supply unit (90) share a single indoor space (S) as a ventilation target space. It is noted that ventilation target spaces for the ventilation system (1) do not have to be included in the same room. In other words, the ventilation target space (S) can be a space among multiple rooms, such as a space in a house and an office.

—Air Supply Unit—

The air supply unit (90) is another ventilation device that is different from the humidity control and ventilation device (10), and acts as an air supplying device to supply the outdoor air to the indoor space (S). The air supply unit (90) includes an air supply duct (91), and an auxiliary air supply fan (92) provided within the air supply duct (91). When the auxiliary air supply fan (92) becomes an operating condition (turns on), outdoor air (OA) is taken into the air supply duct (91). The air that has passed through the air supply duct (91) is supplied to the indoor space (S) as supply air (SA). The air supply unit (90) switches between the operating condition and the shut-down condition by, for example, a user operating a predetermined on-off switch.

—Airflow Rate Control in Conjunction with Operation of Air Supply Unit—

Next, airflow rate control by the humidity control and ventilation device (10) in conjunction with the operation of the air supply unit (90) will be described, with reference to FIGS. 11 and 12.

When the above-described dehumidification mode and humidification mode start, the air-flow-rate controller (101) of the humidity control and ventilation device (10) controls the motors of the air supply fan (26) and the exhaust fan (25) to bring an airflow rate of the air supply fan (26) close to the target airflow rate (target supply airflow rate V-s) and an airflow rate of the exhaust fan (25) close to the target airflow rate (target exhaust airflow rate V-e) (St21). In other words, when the humidity control and ventilation device (10) starts operating, the air supply fan (26) and the exhaust fan (25) execute the constant airflow rate control. It is noted that each airflow rate of the air supply fan (26) and the exhaust fan (25) is updated and adjusted at a predetermined control interval (an interval between each dashed line illustrated in FIG. 12).

Figure 12:
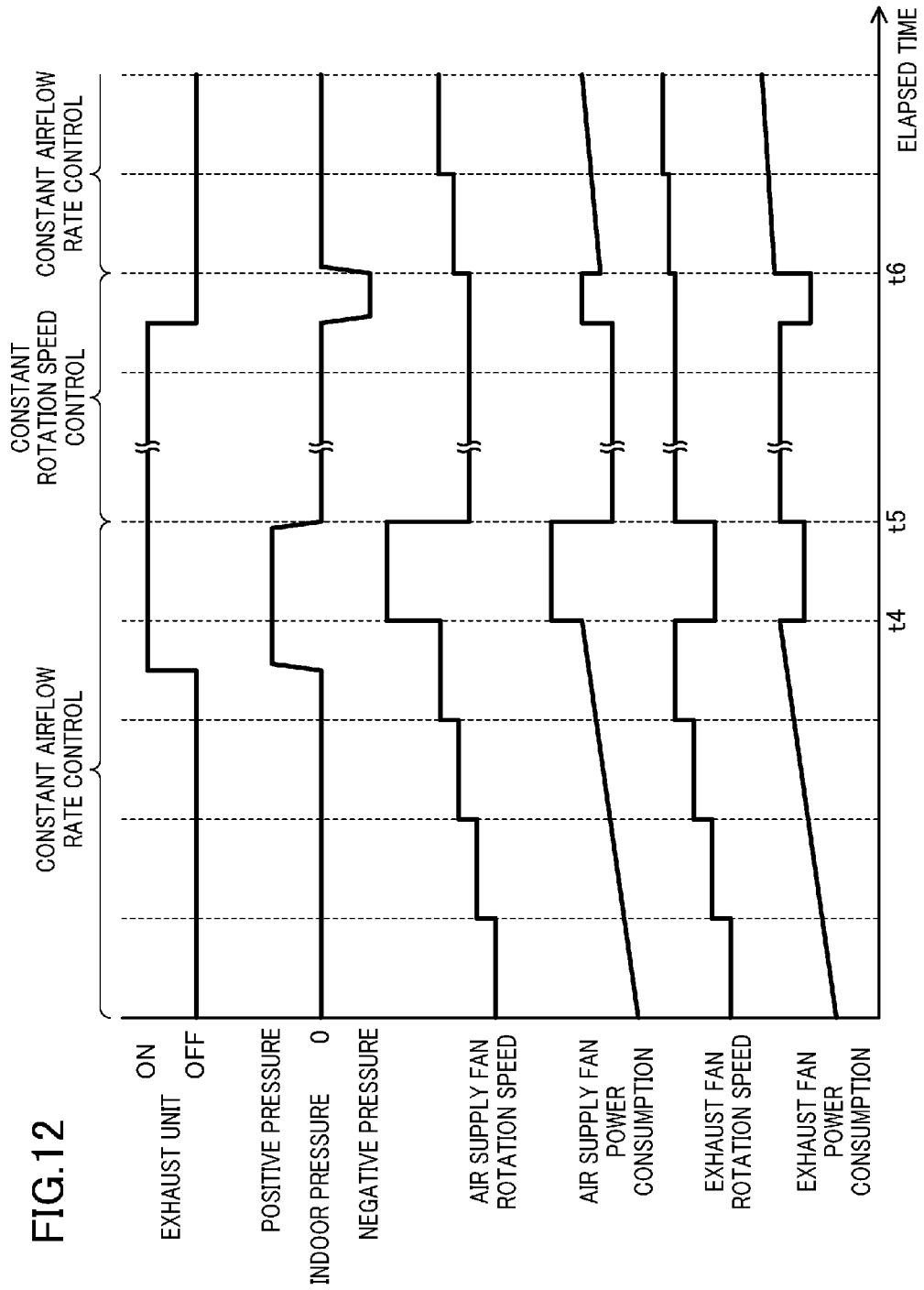
FIG. 12 shows a timing diagram of the airflow rate control according to the second embodiment.

Under the constant airflow rate control, suppose a user turns the air supply unit (90) on from off immediately before an update time t4 illustrated in FIG. 12. Then the auxiliary air supply fan (92) in the air supply unit (90) operates to suck the outdoor air (OA) into the air supply duct (91) and to supply the sucked outdoor air (OA) to the indoor space (S) as the supply air (SA). The resulting pressure in the indoor space (S) increases to be positive pressure.

The positive pressure in the indoor space (S) increases the airflow resistance of the air supply fan (26) in the humidity control and ventilation device (10). Under the constant airflow rate control, this air supply fan (26) is controlled to bring its airflow rate close to the target supply airflow rate V-s. Hence, at the update time t4 immediately after the air supply unit (90) turns on, the motor rotation speed of the exhaust fan (26) drastically varies and increases.

The positive pressure in the indoor space (S) decreases the airflow resistance of the exhaust fan (25) in the humidity control and ventilation device (10). Under the constant airflow rate control, this exhaust fan (25) is controlled to bring its airflow rate close to the target exhaust airflow rate V-e. Hence, at the update time t4 immediately after the air supply unit (90) turns on, the motor rotation speed of the exhaust fan (25) drastically varies and decreases.

The determiner (103) according to the second embodiment determines that the air supply unit (90) has turned on, based on the increasing variation in the motor rotation speed of the air supply fan (26) and the decreasing variation in the motor rotation speed of the exhaust fan (25).

Figure 11:
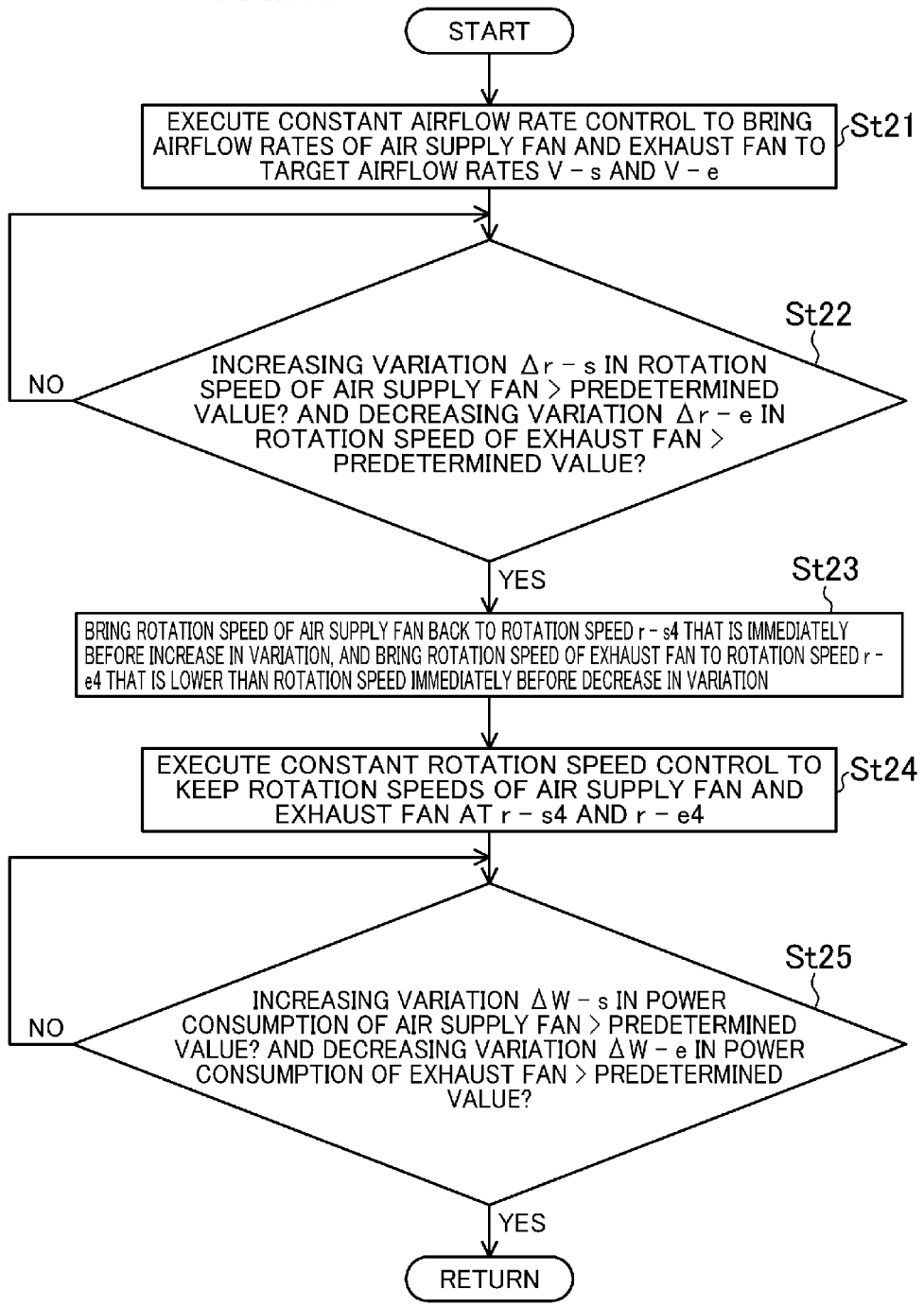
FIG. 11 shows a flowchart of airflow rate control according to the second embodiment.

In other words, the determiner (103) determines in St22 of FIG. 11 whether an increasing variation Δr-s in the motor rotation speed of the air supply fan (26) exceeds a predetermined value and a decreasing variation Δr-e in the motor rotation speed of the exhaust fan (25) exceeds a predetermined value. Then the process proceeds to St23, if, for example at the time t4, the increasing variation Δr-s in the motor rotation speed of the air supply fan (26) exceeds the predetermined value and the decreasing variation Δr-e in the motor rotation speed of the exhaust fan (25) exceeds the predetermined value.

In St23, at the next update time t5, the constant airflow rate control changes to the constant rotation speed control such that the motor rotation speed of the air supply fan (26) slows down by a predetermined rotation speed to lower than the rotation speed at the update time t4 that is immediately before the update time t5. In other words, after the update time t5, the constant rotation speed control is executed to slow down the target motor rotation speed of the air supply fan (26) to lower than a motor rotation speed r-s4 of the air supply fan (26) at the time t4. Simultaneously, in St23, at the update time t5, the constant airflow rate control changes to the constant rotation speed control such that the motor rotation speed of the exhaust fan (25) is brought to be the rotation speed at the update time t4 that is immediately before the update time t5. In other words, after the update time t5, the constant rotation speed control is executed to bring the target motor rotation speed of the exhaust fan (25) to a motor rotation speed r-e4 of the exhaust fan (25) at the time t4.

As described above, when the constant airflow rate control changes to the constant rotation speed control, the airflow rate of the exhaust fan (25) increases as the airflow rate of the air supply fan (26) decreases. As a result, the pressure in the indoor space (S) comes closer to the atmospheric pressure, preventing an excessive supply airflow rate of the air supply fan (26). In other words, in this embodiment, if the determiner (103) determines that the air supply unit (90) has turned on, the airflow rate of the air supply fan (26) immediately falls. This achieves reduction in the power of the air supply fan (26) and improvement in energy conservation.

After St23, the constant rotation speed control is continuously executed to keep the motor rotation speed of the air supply fan (26) at r-s4, and the motor rotation speed of the exhaust fan (25) at r-e4.

Under the constant rotation speed control, suppose the user turns the air supply unit (90) off from on immediately before an update time t6 indicated in FIG. 12. Then the auxiliary air supply fan (92) in the air supply unit (90) stops, and the outdoor air is not supplied into the indoor space (S). In contrast, under the constant rotation speed control, the motor rotation speed of the air supply fan (26) is kept lower than that of the exhaust fan (25). Hence, when the air supply unit (90) stops, the pressure in the indoor space (S) decreases to be negative pressure.

The negative pressure in the indoor space (S) increases the supply airflow rate of the air supply fan (26), followed by an increase in power consumption of the motor of the air supply fan (26). In contrast, the supply airflow rate of the exhaust fan (25) decreases, followed by a decrease in power consumption of the motor of the exhaust fan (25).

The determiner (103) according to this embodiment determines that the air supply unit (90) has turned off, based on the increasing variation in the motor power consumption of the air supply fan (26) and the decreasing variation in the motor power consumption of the exhaust fan (25).

In other words, the determiner (103) determines in St25 of FIG. 11 whether an increasing variation ΔW-s in the motor power consumption of the air supply fan (26) exceeds a predetermined value and a decreasing variation ΔW-e in the motor power consumption of the exhaust fan (25) exceeds a predetermined value. Then the process proceeds to St21, if, for example at the time t6, the increasing variation ΔW-s in the motor power consumption of the air supply fan (26) exceeds the predetermined value and the decreasing variation ΔW-e in the motor power consumption of the exhaust fan (25) exceeds the predetermined value. As a result, the constant rotation speed control changes to the constant airflow rate control, and the rotation speeds of the motors are controlled to bring the airflow rates of the air supply fan (26) and the exhaust fan (25) close to the original target airflow rates V-s and V-e.

As described above, when the constant rotation speed control changes to the constant airflow rate control, the airflow rate of the air supply fan (26) decreases as the airflow rate of the exhaust fan (25) increases. As a result, the pressure in the indoor space (S) comes closer to the atmospheric pressure, preventing an excessive airflow rate of the air supply fan (26). In other words, in this embodiment, if the determiner (103) determines that the air supply unit (90) has turned off, the airflow rate of the air supply fan (26) immediately falls. This achieves reduction in the power of the air supply fan (26) and improvement in energy conservation.

Advantages of Second Embodiment

Under the constant airflow rate control in the second embodiment, whether the air supply unit (90) is on or off is determined based on a variation in rotation speed of each fan (26, 27). The airflow rate of the fan (26, 27) is varied based on the result of the determination. This makes it possible to determine whether the air supply unit (90) is on or off without communications between the humidity control and ventilation device (10) and the air supply unit (90), contributing to reduction in power of the air supply fan (26).

Moreover, in St22, the air supply unit (90) is determined to have turned on if both the increasing variation Δr-s in the motor rotation speed of the air supply fan (26) and the decreasing variation Δr-e in the motor rotation speed of the exhaust fan (25) exceed respective predetermined values. This can prevent the determiner (103) from making an erroneous determination that the air supply unit (90) has turned on, when the rotation speed of the air supply fan (26) varies and increases because of, for example, clog-up of the outside-air filter (28), a malfunction of each damper (41 to 48), etc.

Furthermore, after the air supply unit (90) has turned on, the constant rotation speed control enables the reduction in the rotation speed of the air supply fan (26). This makes it possible to immediately reduce the airflow rate of the air supply fan (26) after the air supply unit (90) turns on, ensuring the reduction in power of the air supply fan (26).

Moreover, in the constant rotation speed control, the air supply unit (90) is determined to have turned off if both the increasing variation ΔW-s in the power consumption of the air supply fan (26) and the decreasing variation ΔW-e in the power consumption of the exhaust fan (25) exceed respective predetermined values. This makes it possible to ensure that the turn-off of the air supply unit (90) is determined without communications between the humidity control and ventilation device (10) and the air supply unit (90).

Modifications of Second Embodiment

The above-described second embodiment can include modifications below.

In the second embodiment, if the increasing variation Δr-s in the motor rotation speed of the air supply fan (26) exceeds a predetermined value and the decreasing variation Δr-e in the motor rotation speed of the exhaust fan (25) exceeds a predetermined value in St22, the process proceeds to St23 and the airflow rate of the air supply fan (26) is reduced. In St22, however, if the increasing variation Δr-s in the motor rotation speed of the air supply fan (26) exceeds the predetermined value regardless of the decreasing variation Δr-e in the motor rotation speed of the exhaust fan (25), the process can proceed to St23 and the airflow rate of the air supply fan (26) can be reduced.

Furthermore, in the second embodiment, if the determiner (103) determines that the air supply unit (90) is in St22, the constant airflow rate control changes to the constant rotation speed control and the airflow rate of the air supply fan (26) is reduced. In St22, however, if the determiner (103) determines that the air supply unit (90) is on, the target airflow rate of the air supply fan (26) can be reduced and the constant airflow rate control can be continuously executed. This also makes it possible to immediately reduce the airflow rate of the air supply fan (26) after the exhaust unit (80) turns on, contributing to the reduction in power of the air supply fan (26).

Moreover, in the second embodiment, if the increasing variation ΔW-s in the motor power consumption of the air supply fan (26) exceeds a predetermined value and the decreasing variation ΔW-e in the motor power consumption of the exhaust fan (25) exceeds a predetermined value in St25, the process proceeds to St21 and the constant rotation speed control changes to the constant airflow rate control. In St25, however, if the increasing variation ΔW-s in the motor power consumption of the air supply fan (26) exceeds the predetermined value regardless of the decreasing variation ΔW-e in the motor power consumption of the air supply fan (26), the process can proceed to St21 and the constant rotation speed control can change to the constant airflow rate control.

INDUSTRIAL APPLICABILITY

As described above, the present invention is useful for a humidity control and ventilation device that ventilates and controls humidity of a room.

DESCRIPTION OF REFERENCE CHARACTERS

10 Humidity Control and Ventilation Device
25 Exhaust Fan
26 Air Supply Fan
50 Refrigerant Circuit (Humidity Controller)
80 Exhaust Unit (Air exhausting device, Another Ventilation Device)
90 Air Supply Unit (Air supplying device, Still Another Ventilation Device)
101 Air-Flow-Rate Controller
103 Determiner

The invention claimed is:

1. A humidity control and ventilation device comprising: an air supply fan configured to supply outdoor air into a ventilation target space; an exhaust fan configured to exhaust air in the ventilation target space out of the target space; a humidity controller configured to control humidity of the air in the ventilation target space; and a controller configured to execute constant airflow rate control to bring airflow rates of the air supply fan and the exhaust fan within respective target airflow rates, the constant airflow rate control including adjusting a rotation speed of the air supply fan and a rotation speed of the exhaust fan, determine when a ventilation device, separate from the humidity control and ventilation device and configured to ventilate air from or to the target space, has turned on, if an increasing variation in the rotation speed of the air supply fan exceeds a first predetermined value or an increasing variation in the rotation speed of the exhaust fan exceeds a second predetermined value while the air supply fan and the exhaust fan are under the constant airflow rate control, and decrease the rotation speed of the air supply fan or the rotation speed of the exhaust fan if it is determined that the separate ventilation device has turned on such that a total air supply rate and a total air exhaust rate in the ventilation target space are equal with each other, wherein if the separate ventilation device determined to be turned on is an air supplying device, the controller is configured to decrease the rotation speed of the air supply fan, while the air supply fan and the exhaust fan are under the constant airflow rate control, the controller is configured to determine that the air supplying device has turned on if a decreasing variation in the rotation speed of the exhaust fan exceeds a third predetermined value simultaneously when the increasing variation in the rotation speed of the air supply fan exceeds the first predetermined value, when determining that the air supplying device is turned on under the constant airflow rate control, the controller is configured to suspend the constant airflow rate control, and execute constant rotation speed control in which the rotation speed of the air supply fan is decreased and the rotation speed of the exhaust fan is increased, and then the rotation speed of the air supply fan and the rotation speed of the exhaust fan are maintained at a constant rotation speed such that the total air supply rate and the total air exhaust rate in the ventilation target space are equal with each other, and when, under the constant rotation speed control, an increasing variation in power consumption of the air supply fan exceeds a fourth predetermined value and a decreasing variation in power of the exhaust fan exceeds a fifth predetermined value, the controller is configured to determine that the air supplying device has turned off, and, when determining that the air device has turned off, the controller is configured to suspend the constant rotation speed control and execute the constant airflow rate control.

2. The humidity control and ventilation device of claim 1, wherein if the separate ventilation device determined to be turned on is an air exhausting device, the controller is configured to decrease the rotation speed of the exhaust fan.

3. The humidity control and ventilation device of claim 2, wherein while the air supply fan and the exhaust fan are under the constant airflow rate control, the controller is configured to determine that the air exhausting device has turned on if a decreasing variation in the rotation speed of the air supply fan exceeds a sixth predetermined value simultaneously when the increasing variation in the rotation speed of the exhaust fan exceeds the second predetermined value.

* * * * *